(12) United States Patent
Salkintzis et al.

(10) Patent No.: US 12,278,862 B2
(45) Date of Patent: *Apr. 15, 2025

(54) SERVICE AREA BASED DNS

(71) Applicant: Lenovo (Singapore) Pte. Ltd., New Tech Park (SG)

(72) Inventors: Apostolis Salkintzis, Athens (GR); Genadi Velev, Darmstadt (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,917

(22) Filed: Nov. 13, 2023

(65) Prior Publication Data

US 2024/0171632 A1    May 23, 2024

Related U.S. Application Data

(63) Continuation of application No. 17/770,927, filed as application No. PCT/EP2019/078601 on Oct. 21, 2019, now Pat. No. 11,870,844.

(51) Int. Cl.
*H04L 61/4511*    (2022.01)
*H04L 61/5007*    (2022.01)
(Continued)

(52) U.S. Cl.
CPC ...... *H04L 67/1021* (2013.01); *H04L 61/4511* (2022.05); *H04L 61/5007* (2022.05); *H04L 67/52* (2022.05)

(58) Field of Classification Search
CPC . H04L 67/1021; H04L 61/5007; H04L 67/52; H04L 61/4511

See application file for complete search history.

(56) References Cited

U.S. PATENT DOCUMENTS 7,653,700 B1 * 1/2010 Bahl ............... H04L 61/45
709/227
2018/0176176 A1   6/2018 Kapur et al.

FOREIGN PATENT DOCUMENTS

EP    1207668 A2    5/2002
EP    1509025 A2    2/2005

OTHER PUBLICATIONS

Huawei, Hislicon, "Pseudo-CR on Edge Application Server Discovery based on DNS", 3GPP TSG-SA WG6, Meeting #33 S6-191886, Sep. 2-6, 2019 (Year: 2019).*

(Continued)

*Primary Examiner* — Suraj M Joshi
(74) *Attorney, Agent, or Firm* — Kunzler Bean & Adamson

(57) ABSTRACT

Apparatuses, methods, and systems are disclosed for supporting edge data network discovery. One apparatus receives a first request from a function in a mobile communication network, the first request including a UE ID and a UE network address. The apparatus may determine whether the UE is located in a first service area based at least in part on a UE location and forward a DNS request to a first DNS server associated with the first service area based at least in part on a determination that the UE is located in the first service area. The apparatus may further receive a DNS reply and transmit a second request to a policy function in the mobile communication network based at least in part on a determination that the DNS reply includes a first IP address.

20 Claims, 13 Drawing Sheets

(51) Int. Cl.
    *H04L 67/1021*     (2022.01)
    *H04L 67/52*     (2022.01)

(56) References Cited

OTHER PUBLICATIONS

3Gpp, 3rd Generation Partnership Project; Technical Specification Group Services and System Aspects; System Architecture for the 5G System (5GS); Stage 2 (Release 16), 3GPP TS 23.501 V16.2.0, Sep. 2019, pp. 1-391 (Year: 2019).*
PCT/EP2019/078601, "Notification of Transmittal of the International Search Report and the Written Opinion of the International Searching Authority, or the Declaration", Feb. 12, 2020, pp. 1-20.
Huawei, Hisilicon, "Pseudo-CR on Edge Application Server Discovery based on DNS", 3GPP TSG-SA WG6 Meeting #33 S6-191886, Sep. 2-6, 2019, pp. 1-3.
Huawei, Hisilicon, "Pseudo-CR on Solution to Edge Application Server discover and update", 3GPP TSG-SA WG6 Meeting #33 S6-191956, Sep. 2-6, 2019, pp. 1-5.
3Gpp, "3rd Generation Partnership Project; Technical Specification Group Services and System Aspects; Study on application architecture for enabling Edge Applications; (Release 17)", 3GPP TR 23.758 V1.0.0, Sep. 2019, pp. 1-78.
3Gpp, 3rd Generation Partnership Project; Technical Specification Group Services and System Aspects; System Architecture for the 5G System (5GS); Stage 2 (Release 16), 3GPP TS 23.501 V16.2.0, Sep. 2019, pp. 1-391.

* cited by examiner

SERVICE AREA BASED DNS

CROSS-REFERENCE TO RELATED APPLICATIONS

This application is a continuation of U.S. application Ser. No. 17/770,927 filed on Apr. 21, 2022, which is a national stage filing of International Patent Application Serial Number PCT/EP2019/078601 entitled "DNS SERVER SELECTION BASED ON THE SERVICE AREA WHERE THE USER-EQUIPMENT IS LOCATED" and filed on Oct. 21, 2019 for Apostolis Salkintzis et al., which is incorporated herein by reference in its entirety.

FIELD

The subject matter disclosed herein relates generally to wireless communications and more particularly relates to DNS request handling for UEs located in various service areas.

BACKGROUND

The following abbreviations and acronyms are herewith defined, at least some of which are referred to within the following description.

Third Generation Partnership Project ("3GPP"), Fifth-Generation Core ("5GC"), Fifth-Generation QoS Indicator ("5QI"), Access and Mobility Management Function ("AMF"), Access Point Name ("APN"), Access Stratum ("AS"), Address Resolution Function ("ARF"), Application Programing Interface ("API"), Data Network Name ("DNN"), Data Radio Bearer ("DRB"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Globally Unique Temporary UE Identity ("GUTI"), Home Subscriber Server ("HSS"), Internet-of-Things ("IoT"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"). Modulation Coding Scheme ("MCS"), Machine Type Communication ("MTC"), Massive MTC ("mMTC"), Mobile Network Operator ("MNO"), Mobility Management ("MM"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), QoS Class Identifier ("QCI"), Registration Area ("RA"), Radio Access Network ("RAN"), Radio Access Technology ("RAT"), Radio Resource Control ("RRC"), Receive ("Rx"), Single Network Slice Selection Assistance Information ("S-NSSAI"), Secure User Plane Location ("SUPL"), Serving Gateway ("SGW"), Session Management Function ("SMF"), System Information Block ("SIB"), Tracking Area ("TA"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), Wireless Local Area Network ("WLAN"), and Worldwide Interoperability for Microwave Access ("WiMAX").

In certain embodiments, communication systems, an edge data network may be deployed to enhance performance. When a UE is located in an edge data network service area, it receives the address of an appropriate edge-instance application server. Otherwise, (i.e., when the UE roams outside the edge data network service area) it receives the address of a default (e.g., cloud-based) instance of the application server.

BRIEF SUMMARY

Methods for supporting edge data network discovery are disclosed. Apparatuses and systems also perform the functions of the methods.

One method of an address resolution function ("ARF") in a mobile network includes receiving a first request from a function in the mobile communication network including a UE identity and a UE network address; determining whether the UE is located in a first service area based on a UE location; forwarding a DNS request received from the UE network address to a first DNS server associated with the first service area in response to determining that the UE is located in the first service area; receiving a DNS reply from the first DNS server; and sending a second request to a policy function in the mobile communication network in response to determining that the DNS reply includes a first IP address.

One method of a session management function ("SMF") in a mobile network includes receiving a first request from a UE to establish a mobile data connection; selecting a first user-plane function for the mobile data connection; determining whether the UE is located in a first service area; configuring the first user-plane function to forward a DNS request received from the UE to a first DNS server associated with the first service area in response to determining that the UE is located in the first service area; receiving a first message from the first user-plane function, the first message indicating that the first DNS server has provided a DNS reply including a first IP address; and inserting a second user-plane function to the mobile data connection that provides a local route to the first IP address.

One method of a user-plane function ("UPF") in a mobile network includes receiving a first instruction to forward a DNS request received from a UE to a first DNS server associated with a first service area and forwarding a DNS request received from the UE to the first DNS server associated with the first service area in response to receiving the instruction. The method includes receiving a DNS reply from the first DNS server; and sending a first message to a session management function in the mobile communication network in response to determining that the DNS reply includes a first IP address.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
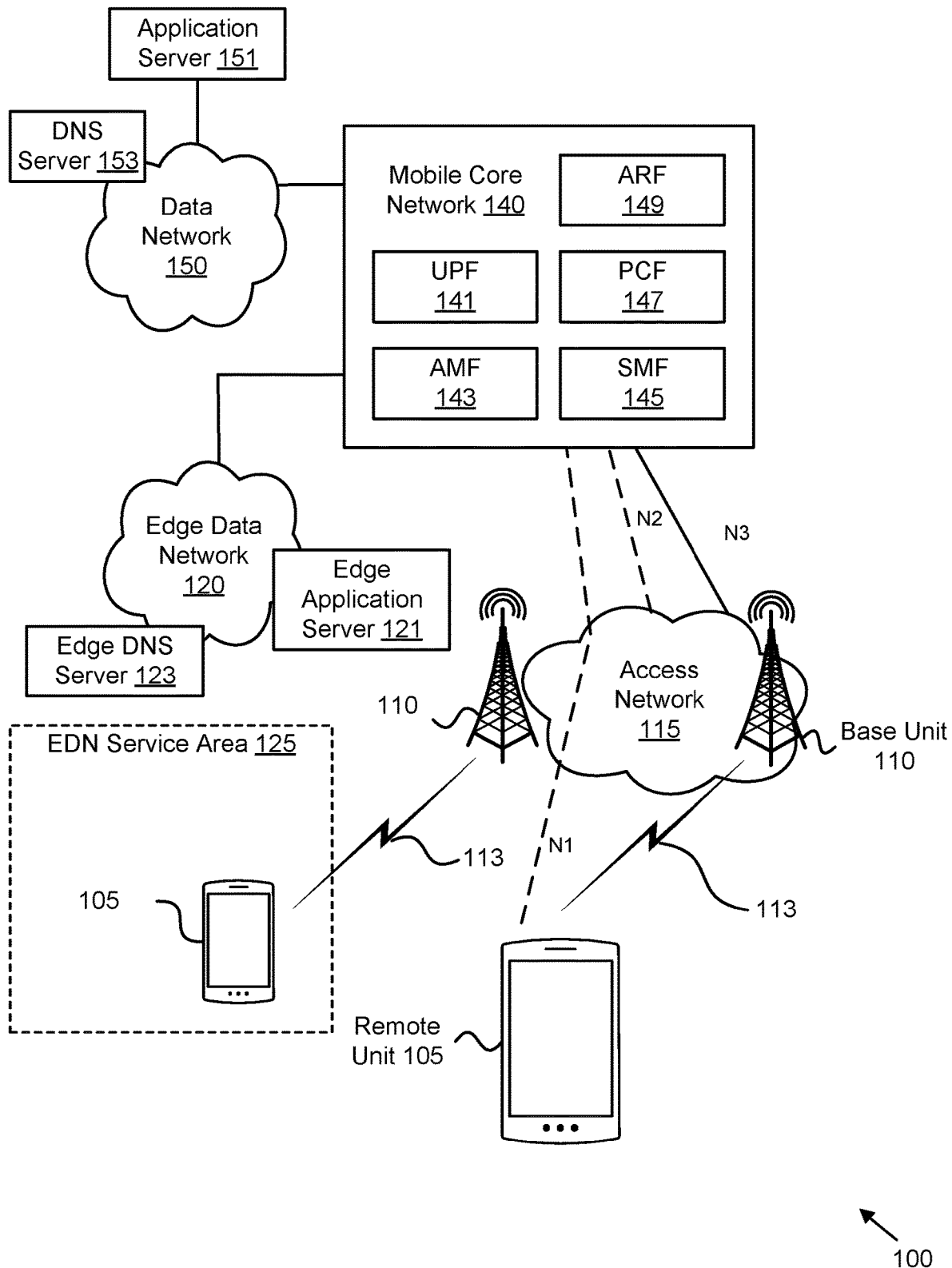
FIG. 1 is a block diagram illustrating one embodiment of a wireless communication system for supporting edge data network discovery.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for supporting edge data network discovery. A UE communicates with a mobile network (e.g. 5G network) that supports edge computing services. The edge computing services are offered by one or more Edge Data Networks (EDNs), which are connected to the mobile network. Each EDN provides edge computing services in a geographical area composed of one or multiple cells and is referred to as the EDN Service Area.

When an Application Client in the UE wants to communicate with an Application Server, and when there are multiple Application Servers instances deployed in various locations in the network, it should be possible for the Application Client to discover and communicate with an Application Server instance that is in close proximity to the UE. The close proximity between the Application Client and the Application Server can typically improve the communication quality and minimize the required user-plane resources.

For example, assume that the Application Client wants to discover and communicate with an Application Server with a hostname "app1.example.com" (also known as Fully Qualified Domain Name, FQDN). For this purpose, the UE would send a DNS query to resolve the hostname to an IP address.

If the UE is located within an EDN Service Area, then the hostname should be resolved to the IP address of the Application Server instance deployed in the EDN, referred to as Edge Application Server. However, if the UE is located outside of any EDN Service Area or it is located in an EDN Service Area that does not support the hostname app1.example.com, then the hostname should be resolved to the IP address of an Application Server instance deployed in the cloud data network, referred to as the Cloud Application Server. Note that all the above Application Server instances are servers providing the same type of services by using the same type of communication protocols. They are only deployed at different network locations.

Because the Application Client is the UE is assumed to be "edge unaware," i.e. it does not support edge-specific APIs that can facilitate the discovery of the Application Server's IP address, the problem is how to discover an appropriate Application Server close to the location of the Application Client when there are multiple instances of the Application Server distributed in various locations.

In one embodiment, a "geo-DNS" mechanism is used in which a DNS server returns one of a plurality of Application Server addresses based on the IP address of the requesting host/UE. The IP address of the requesting host/UE is associated with a geographic location, e.g. a neighborhood, a city, a country, etc., which works well with fixed hosts/UEs. However, in the context of a mobile communication network, the geo-DNS mechanism is not effective because the requesting host/UE may be roaming across a large geographic area (e.g. across an entire country) without changing its IP address. Therefore, the IP address of the UE does not provide accurate location information and cannot be used for discovering an Application Server near to UE, e.g. in an Edge Data Network.

To overcome this geo-DNS limitation, the present disclosure proposes a different mechanism for Application Server discovery that is particularly suitable for 5G mobile communication networks.

In various embodiments, a DNS Server/Proxy is deployed in the mobile communication network, which receives all DNS queries from the UE via the user plane. The DNS Server/Proxy determines the location of the UE via a control-plane interface with 5GC and forwards a received DNS query to another DNS server based on the determined UE location. For example, if the UE is determined to be inside the EDN-2 Service Area, all DNS queries of the UE are forwarded to the EDN-2 DNS Server.

In another scenario, the DNS Server/Proxy deployed in the mobile communication network may be configured with the FQDNs and IP addresses of the Application Servers deployed in the EDNs. In this scenario, the DNS Server/

Proxy does not forward a received DNS query to another DNS server, should the DNS Server/Proxy have the information for responding itself to the DNS query.

If the UE is determined to be outside of any EDN Service Area, all DNS queries of the UE are forwarded to the Cloud DNS Server. Each DNS Server in an EDN can resolve the hostnames for all Edge Application Servers supported by the EDN. The Cloud DNS Server can resolve the hostnames for all Application Servers deployed in the cloud (e.g. on the Internet). For this purpose, the Cloud DNS Server applies recursive DNS resolution and communicates with additional DNS servers on the Internet.

FIG. 1 depicts a wireless communication system 100 for supporting edge data network discovery, according to embodiments of the disclosure. In one embodiment, the wireless communication system 100 includes at least one remote unit 105, at least one base unit 110, an access network ("AN") 115, an edge data network 120, and a mobile core network 140. The AN 115 and the mobile core network form a mobile communication network. The AN 115 may be composed of at least one base unit 110. The remote unit 105 may communicate with the access network 115 using 3GPP communication links and/or non-3GPP communication links, according to a radio access technology deployed by the AN 115. Even though a specific number of remote units 105, base units 110, ANs 115, edge data networks 120, and mobile core networks 140 are depicted in FIG. 1, one of skill in the art will recognize that any number of remote units 105, base units 110, ANs 115, edge data networks 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the access network 115 via uplink ("UL") and downlink ("DL") communication signals. Furthermore, the UL and DL communication signals may be carried over the communication links 113. Note, that the access network 115 is an intermediate network that provide the remote units 105 with access to the mobile core network 140.

In some embodiments, the remote units 105 communicate with an application server 151 (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the access network 115. The mobile core network 140 then relays traffic between the remote unit 105 and the data network 150 (e.g., application server 151) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other communication peers.

As discussed in further detail below, the mobile data connection (PDU session) of a remote unit 105 may be modified to include an edge application server 121 if the remote unit 105 is located in the EDN service area 125. Further, the mobile core network 140 may route DNS queries to the Edge DNS server 123 if the if the remote unit 105 is located in the EDN service area 125. Otherwise, if the remote unit 105 is not located in an EDN service area 125, then the mobile core network 140 may route DNS queries to the DNS server 153 located in the data network 150.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 115, that may include one or more controllers communicably coupled to one or more corresponding base units 110. These and other elements of radio access network are not illustrated but are well known generally by those having ordinary skill in the art. The base units 110 connect to the mobile core network 140 via the access network 115.

The base units 110 may serve a number of remote units 105 within a serving area, for example, a cell or a cell sector, via a communication link 113. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 110.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least one UPF 141 that serves the access network 115. Note that in certain embodiments, the mobile core network may contain one or more intermediate UPFs, for example a first UPF that serves the edge data network 120. In such embodiments, the UPF 141 would be a central UPF, as discussed in further detail below.

The mobile core network 140 also includes multiple control plane functions including, but not limited to, an Access and Mobility Management Function ("AMF") 143, a Session Management Function ("SMF") 145, and Policy Control Function ("PCF") 147. In certain embodiments, the mobile core network 140 may also include a Unified Data Management function ("UDM"), an Authentication Server Function ("AUSF"), a Network Repository Function ("NRF") (used by the various NFs to discover and communicate with each other over APIs), or other NFs defined for the 5GC.

The present disclosure introduces a new 5G network function, called Address Resolution Function ("ARF") 149 which functions as a DNS Server/Proxy in the mobile core network 140. The ARF 149 receives all DNS queries from the remote unit 105 via the user plane. The ARF 149 determines the location of the remote unit 105 via a control-plane interface with the mobile core network 140 and forwards a received DNS query to another DNS server based on the determined location of the remote unit 105. Thus, when the remote unit 105 is located in an EDN service area 125, the ARF 149 forwards a DNS query received from the remote unit 105 to the Edge DNS server 123. While FIG. 1 depicts the ARF 149 as part of the mobile core network 140, in other embodiments the ARF 149 may be outside the mobile core network. In certain embodiments, the ARF 149 may be a part of data network 150. In such embodiments, the ARF 149 may be combined with the DNS server 153. Alternatively, the ARF 149 may be a separate function within the data network 150.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

Figure 2:
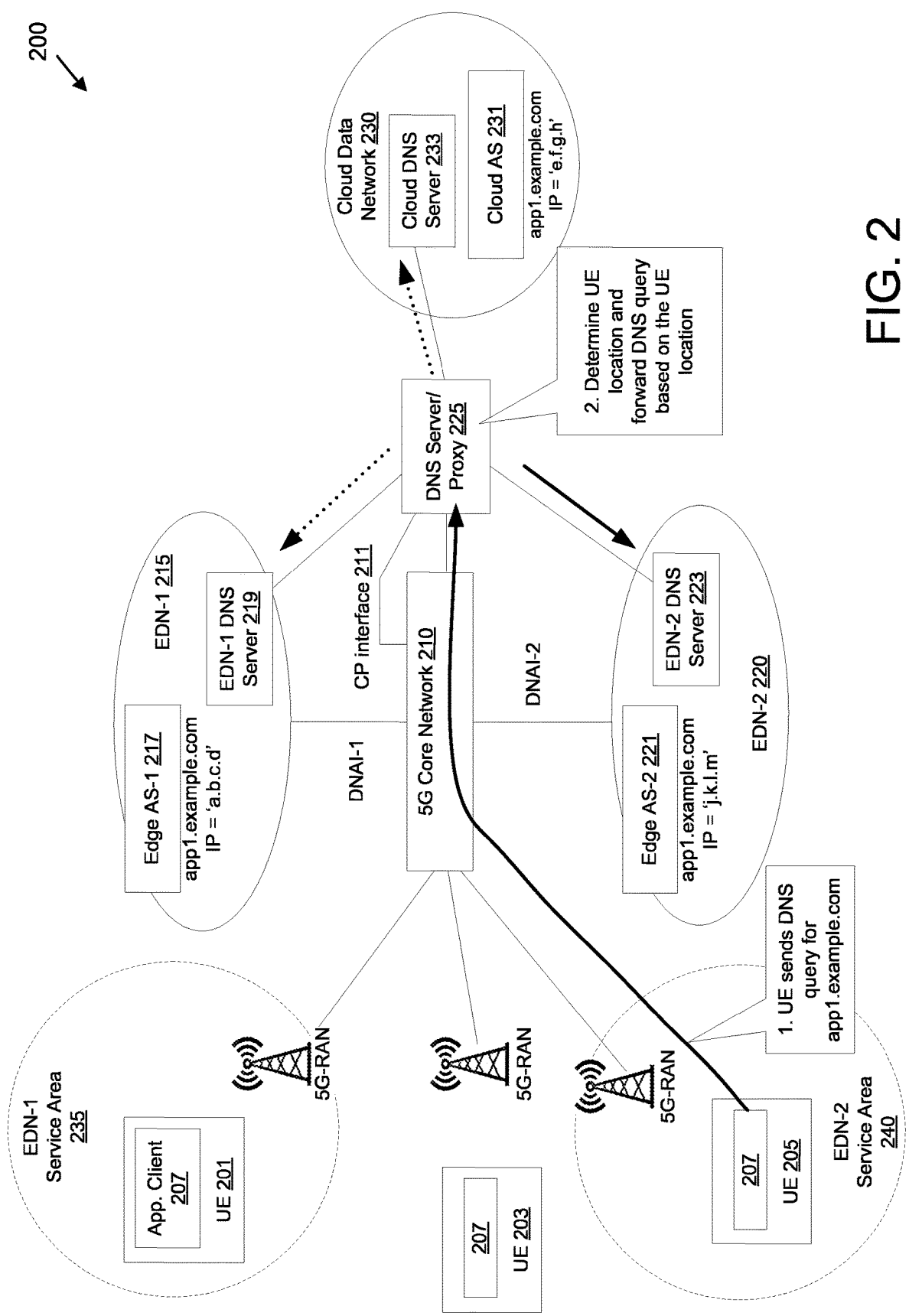
FIG. 2 is a network diagram illustrating one embodiment of a network deployment for supporting edge data network discovery.

FIG. 2 depicts a network deployment 200 comprising a 5G core network 210 and a plurality of edge data networks ("EDNs"), each EDN having a corresponding EDN service area. The depicted network deployment 200 includes at least first EDN ("EDN-1") 215 and a second EDN ("EDN-2") 220. While the depicted embodiment shows two EDNs, in other embodiments the network deployment 200 may include more ENDs or fewer EDNs. Each EDN is associated with an EDN service area. As depicted, the first EDN 215 is associated with a first EDN service area 235 and the second EDN 220 is associated with a second EDN service area 240. Note that for certain application servers, a local instance of the AS may be located in the EDN (e.g., Edge AS-1 217 and Edge AS-2 221). The 5G core network 210 also provides access to the "cloud," e.g., an external data network, referred to as the cloud data network 230. Here, the cloud data network 230 includes the cloud AS 231 and the cloud DNS server 233. In the deployment 200, the Edge AS-1 217, Edge AS-2 221, and Cloud AS 231 are separate instances of the same AS having the hostname 'app1.example.com.'

The UEs 201, 203 and 205 communicate with a mobile network (e.g. 5G network) that supports edge computing services. The UEs 201-205 are embodiments of the remote unit 105 and include an instance of the Application Client 207. When the Application Client 207 in the UE 205 wants to communicate with an Application Server, and when there are multiple Application Servers instances deployed in various locations in the network, it should be possible for the Application Client 207 to discover and communicate with an Application Server instance that is in close proximity to the UE 205. The close proximity between the Application Client 207 and the Application Server can typically improve the communication quality and minimize the required user-plane resources. However, the Application Client 207 in the UE 205 is assumed to be "edge unaware," i.e., it does not support edge-specific APIs that can facilitate the discovery of the Application Server's IP address. Therefore, the Application Client 207 applies the traditional DNS-based mechanism for discovering the Application Server's IP address.

The network deployment 200 also includes a DNS Server/Proxy 225 that is deployed in the mobile communication network, which receives all DNS queries from the UE 205 via the user plane. Note that IETF protocol says that location cannot be sent in a DNS query. Thus, the DNS Server/Proxy 225 determines the location of the UE 205 via a control-plane interface 211 with 5GC 210 and forwards a received DNS query to another DNS server based on the determined UE location. While FIG. 2 shows the DNS Server/Proxy 225 outside the 5G core network 210, in other embodiments the DNS Server/Proxy 225 is located within the 5G core network 210.

For example, if the UE 205 is determined to be inside the EDN-2 Service Area 240, all DNS queries of the UE are forwarded to the EDN-2 DNS Server 223. As another example, if the UE 201 is determined to be inside the EDN-1 Service Area 235, all DNS queries of the UE 201 are forwarded to the EDN-1 DNS Server 219. Note that if the UE 201 leaves the EDN-1 Service Area 235—or if the UE 205 leaves the EDN-2 Service Area 240—then subsequent DNS queries from the UE is to be forwarded to the Cloud DNS server 233. While FIG. 2 shows the DNS Server/Proxy 225 and the Cloud DNS server 233 as separate functions, in other embodiments the DNS Server/Proxy 225 and Cloud DNS server 233 may be combined into a single function.

In another scenario, the DNS Server/Proxy 225 deployed in the mobile communication network may be configured with the FQDNs and IP addresses of the Application Servers deployed in the EDNs. In this scenario, the DNS Server/Proxy 225 does not forward a received DNS query to another DNS server (e.g., EDN-1 DNS Server 219, EDN-2 DNS server 223, or Cloud DNS server 233), should the DNS Server/Proxy 225 have the information for responding itself to the DNS query. However, if the DNS Server/Proxy 225 is unable to resolve the hostname, then the DNS Server/Proxy 225 will forward the DNS query to another DNS server (e.g., the Cloud DNS server 233).

Because the UE 203 is determined to be outside of any EDN Service Area, all DNS queries of the UE 203 are forwarded to the Cloud DNS Server 233. Each DNS Server 219, 223 in an EDN can resolve the hostnames for all Edge Application Servers supported by the EDN. The Cloud DNS Server 233 can resolve the hostnames for all Application Servers deployed in the cloud (e.g. on the Internet). For this purpose, the Cloud DNS Server 233 applies recursive DNS resolution and communicates with additional DNS servers on the Internet.

The DNS Server/Proxy 225 shown in FIG. 2, although shown outside the 5G core network 210, it can be deployed inside the 5G core network 210. The DNS Server/Proxy 225 uses CP interface 211 to return the appropriate IP address. Additionally, the DNS Server/Proxy 225 may use the CP interface 211 to configure the 5G core network 210 for routing to an appropriate EDN, where applicable. Note that all the Application Server instances 217, 221, and 231 are servers providing the same type of services by using the same type of communication protocols. They are only deployed at different network locations and are thus addressable using different IP addresses.

In a first embodiment, the DNS Server/Proxy 225 is located in an Address Resolution Function ("ARF"). Here, the ARF uses the control-plane interface to communicate with the SMF, the PCF, and the NEF in the 5G core network 210. Note that the ARF may be located inside the 5G core network 210 or outside the 5G core network 210. In the ARF-based solution, the CP interface 211 is used for monitoring the UE location and for configuring the 5G core 210 for routing to an appropriate EDN. DNS handling procedures according to this first embodiment are discussed in further detail below with reference to FIGS. 3A-3C. In a second embodiment, the DNS Server/Proxy 225 is located in a User Plane Function, UPF (e.g., in the 5G core network 210). Here, the UPF uses the control-plane interface to communicate with the SMF. In the UPF-based solution, the CP interface 211 is used for communication between the SMF and UPF (similar to the existing N4 interface). DNS handling procedures according to this second embodiment are discussed in further detail below with reference to FIGS. 4A-4C.

Assume that the Application Client 207 wants to discover and communicate with an Application Server with a hostname "app1.example.com" (also known as Fully Qualified Domain Name, FQDN). For this purpose, the UE 205 would send a DNS query to resolve the hostname to an IP address. For the UE 201 that is located in the EDN-1 Service Area, the hostname should be resolved to the IP address 'a.b.c.d'. This enables the Application Client 207 to communicate with the Application Server instance deployed in EDN-1, i.e., the first Edge Application Server ("Edge AS-1") 217.

For the UE 205 that is located in the EDN-2 Service Area, the hostname should be resolved to the IP address 'j.k.l.m'. This enables the Application Client 207 to communicate with the Application Server instance deployed in EDN-2, i.e., the second Edge Application Server ("Edge AS-2") 221. However, for the UE 203 that is located outside of any EDN Service Area (or for a UE that is located in an EDN Service Area that does not support the hostname 'app1.example.com'), then the hostname should be resolved to the IP address 'e.f.g.h'. This enables the Application Client 207 to communicate with the Application Server instance deployed in the cloud data network, i.e., the Cloud Application Server 231.

Figure 3A:
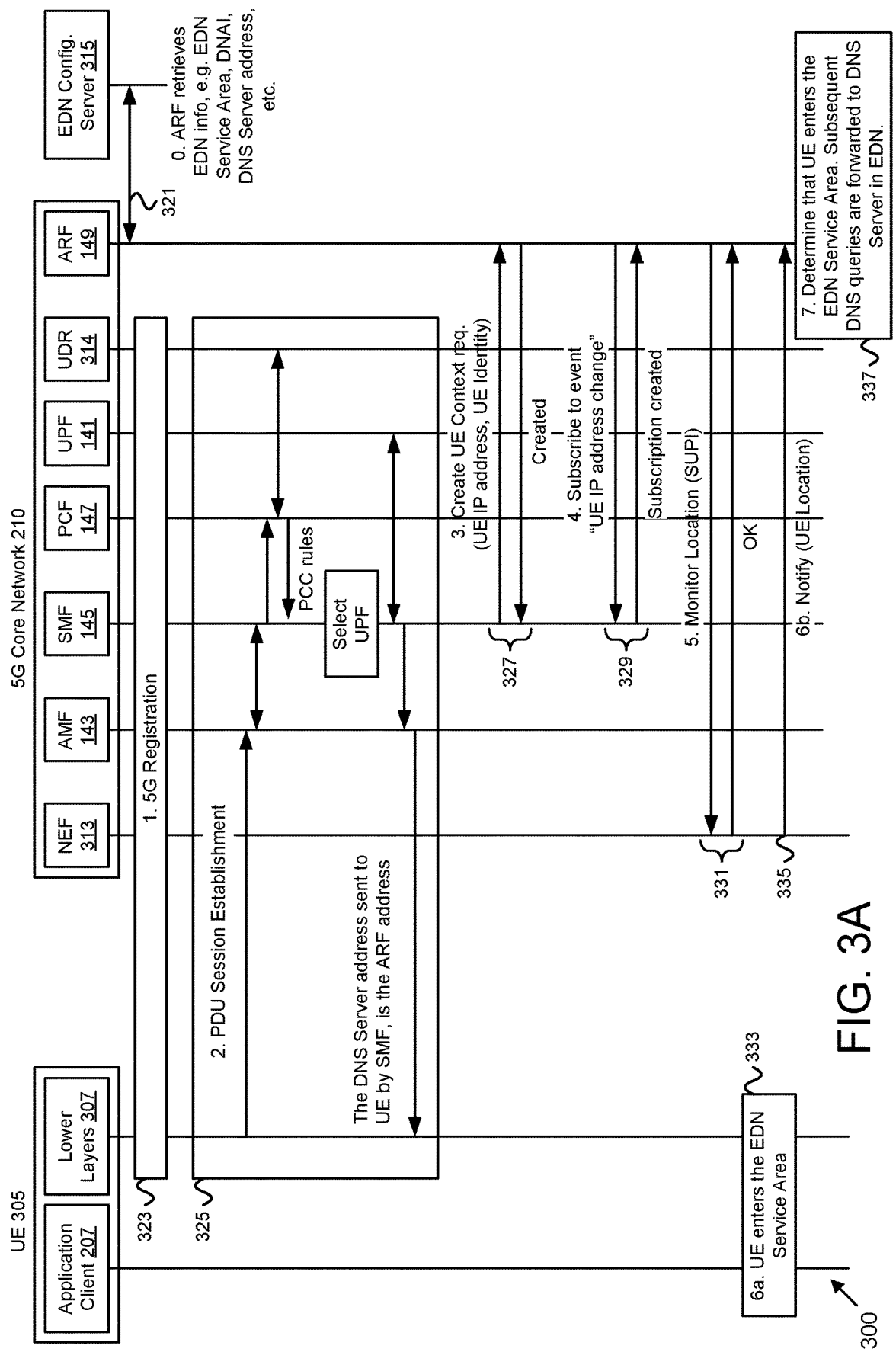
FIG. 3A is a signal flow diagram illustrating one embodiment of AMF-based DNS handling.
Figure 3B:
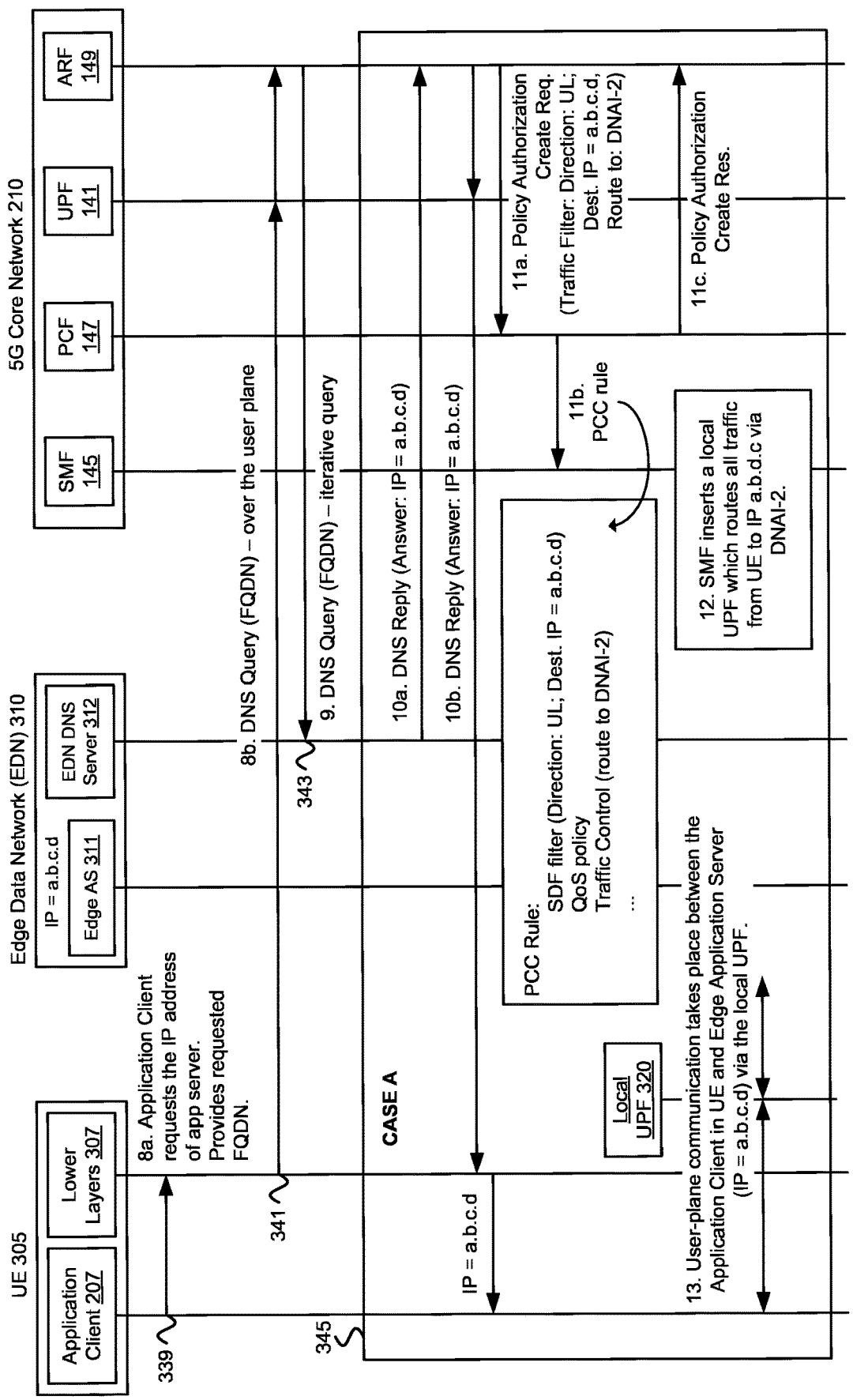
FIG. 3B is a continuation of the procedure depicted in FIG. 3A.
Figure 3C:
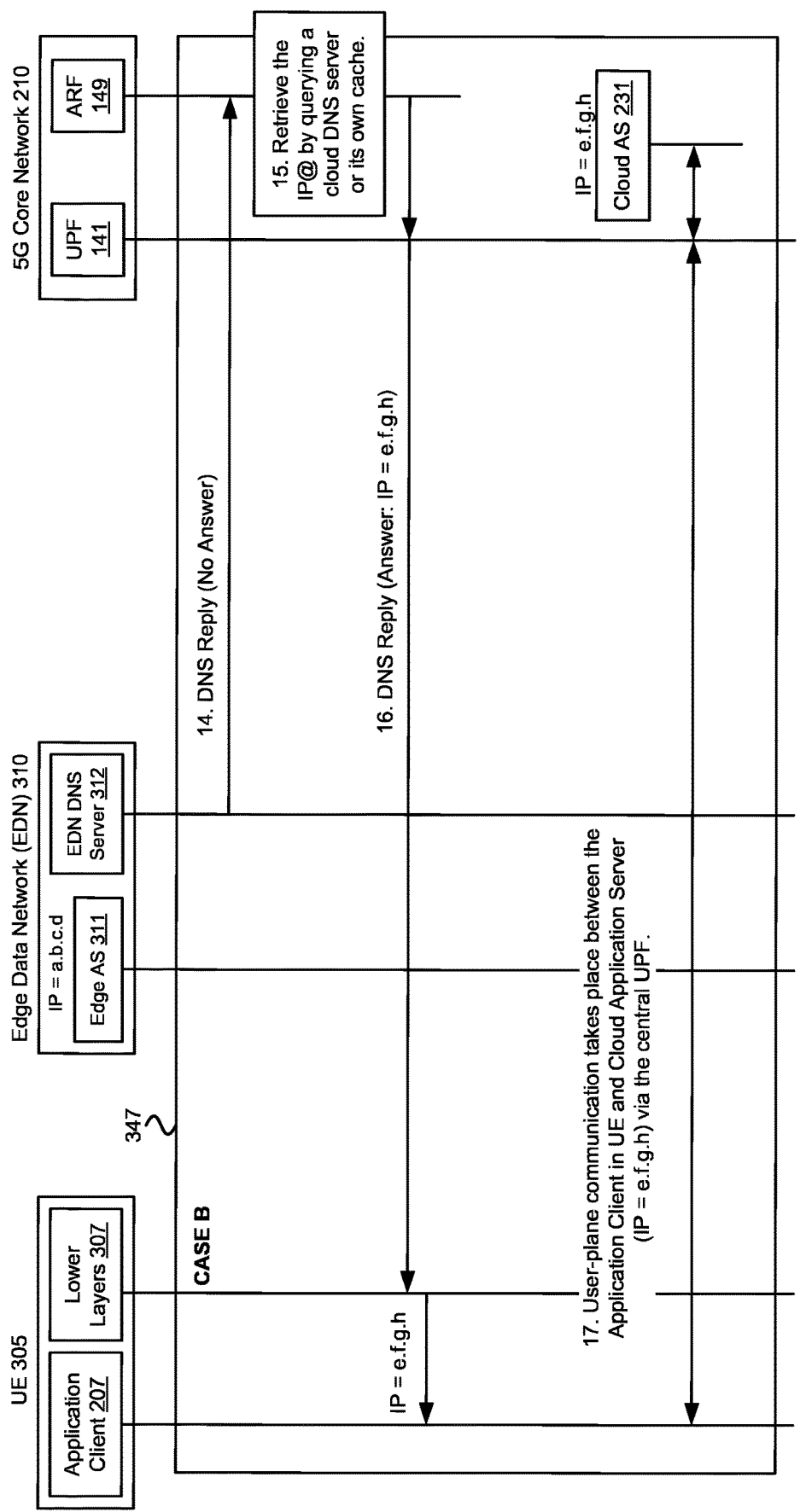
FIG. 3C is a continuation of the procedure depicted in FIGS. 3A and 3B.

FIGS. 3A-3C depict a procedure 300 for an ARF-based DNS handling solution, according to embodiments of the disclosure. The procedure 300 involves the UE 305, the EDN 310, and the 5G core network 210. The procedure 300 enables a mobile communication network to detect when the UE 305 attempts to discover the IP address of an Application Server and to provide to the UE 305 the IP address of the physically closest Application Server, i.e., of an Application Server located in an Edge Data Network (EDN). The solution is based on the principle presented in FIG. 2 and utilizes an Address Resolution Function (ARF) 149, which is an embodiment of the DNS Server/Proxy 225 in FIG. 2. The UE 305 is an embodiment of the remote unit 105 and includes an instance of the application client 207 as well as lower layers 307 (e.g., NAS layer, AS layer, etc.).

Referring to FIG. 3A, the procedure 300 begins at step 0 as the ARF 149 acquires information about the EDNs deployed in the 5G network (see messaging 321). In the depicted embodiment, this information may be received from an EDN Configuration Server (EDN CS) 315, as the one defined in 3GPP TR 23.758. In other embodiments, the EDN deployment information may be received from the Operations, Administration and Management (OAM) system, or may be configured in the ARF 149 via other means.

The EDN deployment information in the ARF 149 may include the EDN Service Area, the address of the EDN DNS Server, the Data Network Access Identifier (DNAI) a location identifier associated with the EDN, etc. In one scenario, the information in the ARF 149 about an EDN may also contain the FQDNs and IP addresses of the Application Servers deployed in this EDN (so, the ARF 149 incorporates also the EDN DNS servers). This is especially useful when the EDNs and the ARF 149 are operated by the same network operator.

At step 1, the UE 305 performs a normal 5G registration to register with the 5G network (see block 323). At step 2, the UE 305 requests the establishment of a PDU Session, e.g., in order to access the Internet via the 5G network (see block 325). The SMF 145 selects an ARF 149 as a DNS server for this PDU Session and provides to UE 305 the address of this ARF as the address of the DNS server. The SMF 145 may decide to select an ARF 149 as a DNS Server for this PDU Session because the UE subscription data (stored in UDR 314) indicates that the UE 305 is allowed to access edge computing services via this PDU Session. In some scenarios, however, the SMF 145 may not select an ARF 149 as a DNS server for the PDU Session. For example, if this is a PDU Session for IMS services and the IMS functions are deployed in the cloud, the SMF 145 may determine to not select an ARF 149 for this PDU Session.

During step 2, the SMF 145 selects only one UPF 141 (a central UPF) that provides access to an external Data Network (DN), such as the Internet or a corporate data network. The SMF 145 may receive PCC rules from the PCF 147 which indicate that some traffic of the UE 305 should be routed to an EDN via a local UPF 320, not via the central UPF 141. However, the SMF 145 does not insert a local UPF 320 to the data path of the PDU Session because the SMF 145 does not know if the UE 305 will later initiate this traffic that should be routed to an EDN. If the SMF 145 inserts a local UPF 320 to the data path of the PDU Session (so there is a central UPF 141 and a local UPF 320) but the UE 305 does not initiate the traffic that should be routed to an EDN via the local UPF 320, then the local UPF 320 will only introduce extra latency on the data path and will consume an lot of resources unnecessarily.

At step 3, right after the SMF 145 knows the IP address assigned to UE 305 for the PDU Session (e.g. after responding to a DHCPv4 request from the UE 305, or after receiving a Neighbor Solicitation including the IPV6 address of the UE 305 as part of a Duplicate Address Detection procedure), the SMF 145 provides to the selected ARF 149 the UE's IP address and the UE's identity (e.g. SUPI or external identifier). As depicted, the SMF 145 may send a Create UE Context request containing the UE IP address and UE Identity (see messaging 327). This UE identifier enables the ARF 149 to monitor the UE's location (see step 5).

At step 4, the ARF 149 subscribes with SMF 145 for receiving the new IP address of the UE 305, in case this IP address changes later (see messaging 329). This enables the ARF 149 to always have the correct IP address of the UE 305. At step 5, the ARF 149 initiates the monitoring of UE's location either 1) by subscribing with NEF 313 for location monitoring events and receiving location reports for this UE or 2) by utilizing the location services (LCS) of the 5GS and contacting directly the Gateway Mobile Location Centre (GMLC) via the Le reference point (see messaging 331).

From the received location reports and from the EDN information received in step 0, the ARF 149 can determine if the UE 305 is located inside an EDN Service Area 125 or not. Initially, it is assumed that the UE 305 is not located in an EDN Service Area 125. Under this assumption, every DNS query received by ARF 149 from the UE 305 is forwarded to the Cloud DNS Server 233 until a notification is received.

At step 6, the UE 305 moves to a new location and enters an EDN Service Area 125 (see block 333). This is identified by the ARF 149, e.g., after receiving a location report from NEF 313 (see messaging 335). At step 7, the ARF 149 determines that the UE 305 is now located inside an EDN Service Area 125 and it is configured to forward subsequent DNS queries from the UE 305 to the EDN DNS Server 312 (not to the Cloud DNS Server 233) (see block 337).

Continuing on FIG. 3B, at step 8, an Application Client in the UE 305 wants to start communication with an Application Server with a hostname (or FQDN) app1.example.com. To resolve the hostname into an IP address, the UE 305 sends a DNS query including the FQDN (see messaging 339). This DNS query is sent to the ARF 149 via the UPF 141 (see messaging 341).

At step 9, because the ARF 149 has determined that the UE 305 is located inside an EDN Service Area 125, the ARF 149 (operating as a DNS proxy) forwards the DNS query to the EDN DNS server 312 (see messaging 343).

In the scenario where the ARF 149 contains also the FQDNs and IP addresses of the Application Servers deployed in EDNs, the ARF 149 may resolve locally the hostname/FQDN into an IP address and can return the IP address to the UE 305 itself, instead of forwarding the DNS query to the EDN DNS server 312.

FIG. 3B depicts the Case A where the DNS reply from the EDN DNS server 312 contains an IP address (see block 345). At step 10a, the EDN DNS server 312 resolves the FQDN into the IP address 'a.b.c.d' and sends a DNS Reply to ARF 149. At step 10b, the ARF 149 forwards the DNS Reply to the UE 305. The DNS Reply from the EDN DNS server 312 indicates that there is a local instance of the Application Server in the EDN identified by the provided FQDN/hostname.

At step 11, the ARF 149 triggers the 5G core network to insert a local UPF 320 in the PDU Session data path that provides local access to the EDN 310 and will route the traffic between the Application Client 207 in the UE 305 and an Application Server in the EDN 310 (the Edge Application Server 311). For this purpose, the ARF 149 sends a Policy Authorization Create request to PCF 147 indicating that the uplink traffic (sent from UE 305) to the destination IP address 'a.b.c.d' should be routed via a certain DNAI (e.g. DNAI-2). The PCF 147 creates an associated PCC rule and sends a notification to SMF 145 including this PCC rule. Note that the DNAI-2 identifies a specific location, such as "Frankfurt airport," "Shopping mall A," "Company B," etc.

At step 12, the SMF 145 selects a local UPF 320 that can provide access via DNAI-2 (e.g. a UPF deployed near "Frankfurt airport") and configures this UPF 320 to route the uplink traffic (sent from UE 305) to the destination IP address 'a.b.c.d' via DNAI-2. All other traffic is routed by the local UPF 320 to the central UPF 141.

At step 13, user-plane communication takes place between the Application Client 207 in the UE 305 and the Edge Application Server 311 in the EDN 310 via the local UPF 320. Later, when the ARF 149 determines that the UE 305 exits the EDN Service Area 125, the ARF 149 may send a Policy Authorization Delete request to the PCF 147, which may delete the associated PCC rule and inform the SMF 145. This can trigger the SMF to remove the local UPF from the data path of the PDU Session.

Note that the ARF 149 may send the DNS Reply to UE 305, not in step 10b, but after step 11c when the 5G core has initiated the insertion of the local UPF 320 in the data path.

FIG. 3C depicts the Case B where the DNS reply from the EDN DNS server 312 does not contain an IP address (or no answer is received from EDN DNS server 312) (see block 347). At step 14, the EDN DNS server 312 cannot resolve the FQDN into an IP address because there is no Application Server in the EDN 310 identified by the provided FQDN. Therefore, the EDN DNS server 312 responds with a DNS Reply containing no answer (no IP address).

At step 15, the ARF 149 forwards the DNS query to a cloud DNS server (e.g., the Cloud DNS Server 233) or resolves the FQDN by using its own DNS information (cache). As a result, the FQDN is resolved to the IP address 'e.f.g.h.' At step 16, the ARF 149 sends the DNS Reply to UE 305.

At step 17, user-plane communication takes place between the Application Client 207 in the UE 305 and the cloud Application Server 231 via the central UPF 141. When the above PDU Session is released, then the SMF 145 sends to the ARF 149 a message to delete the UE context created in step 3 and, thus, to stop monitoring the location of this UE 305 (unless the same UE has other active PDU Sessions associated with this ARF 149).

Figure 4A:
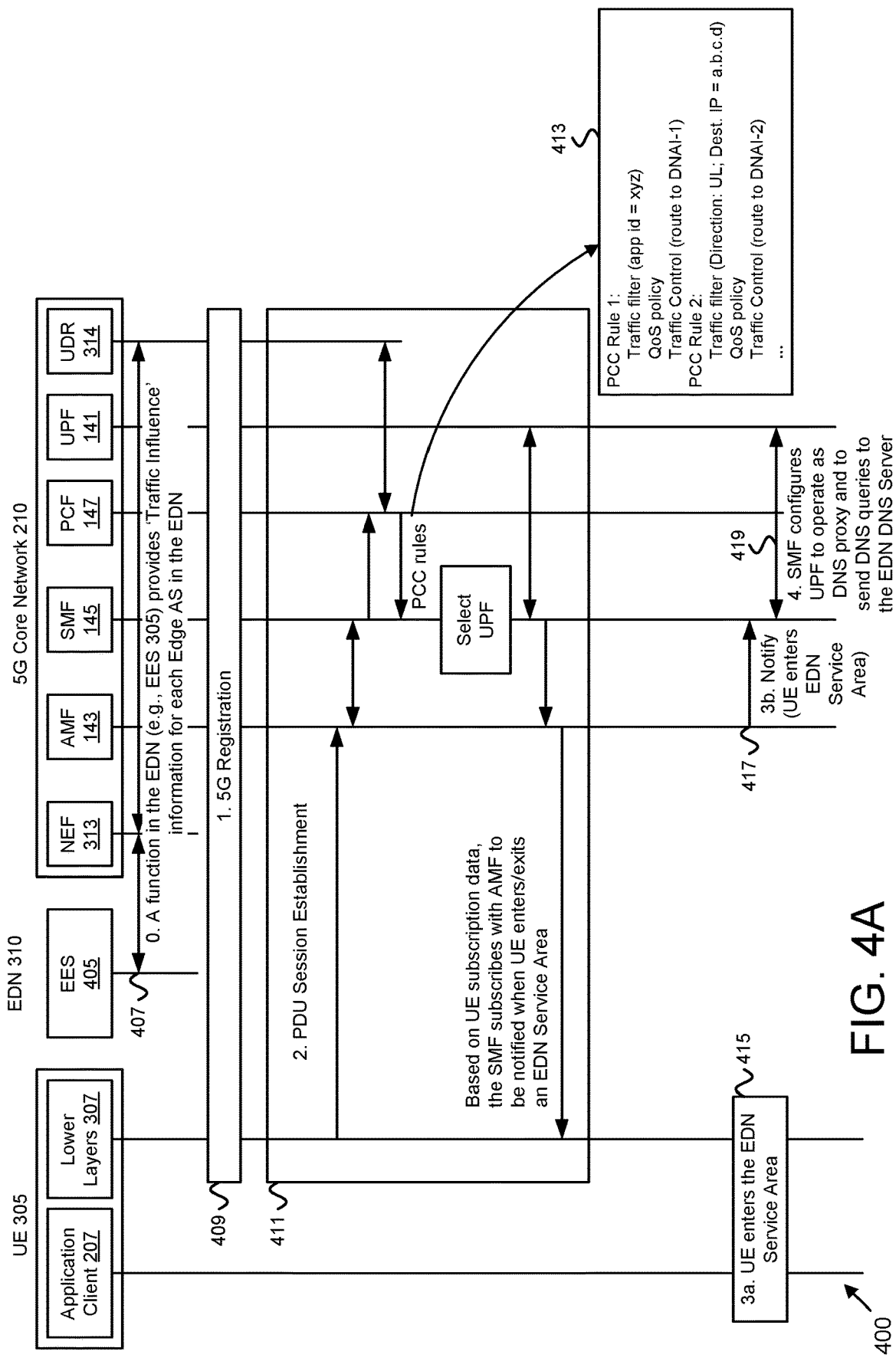
FIG. 4A is a signal flow diagram illustrating one embodiment of UPF-based DNS handling.
Figure 4B:
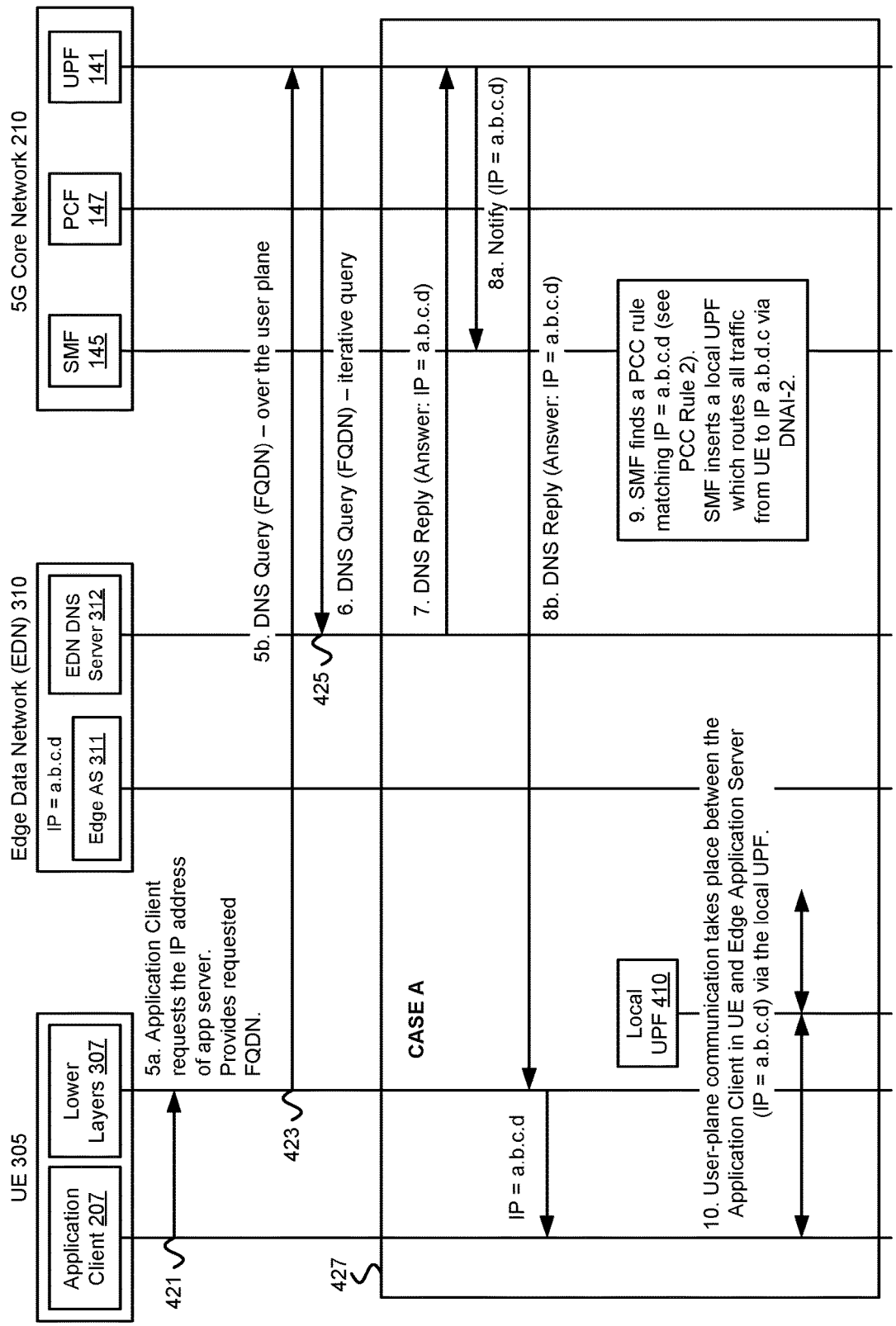
FIG. 4B is a continuation of the procedure depicted in FIG. 4A.
Figure 4C:
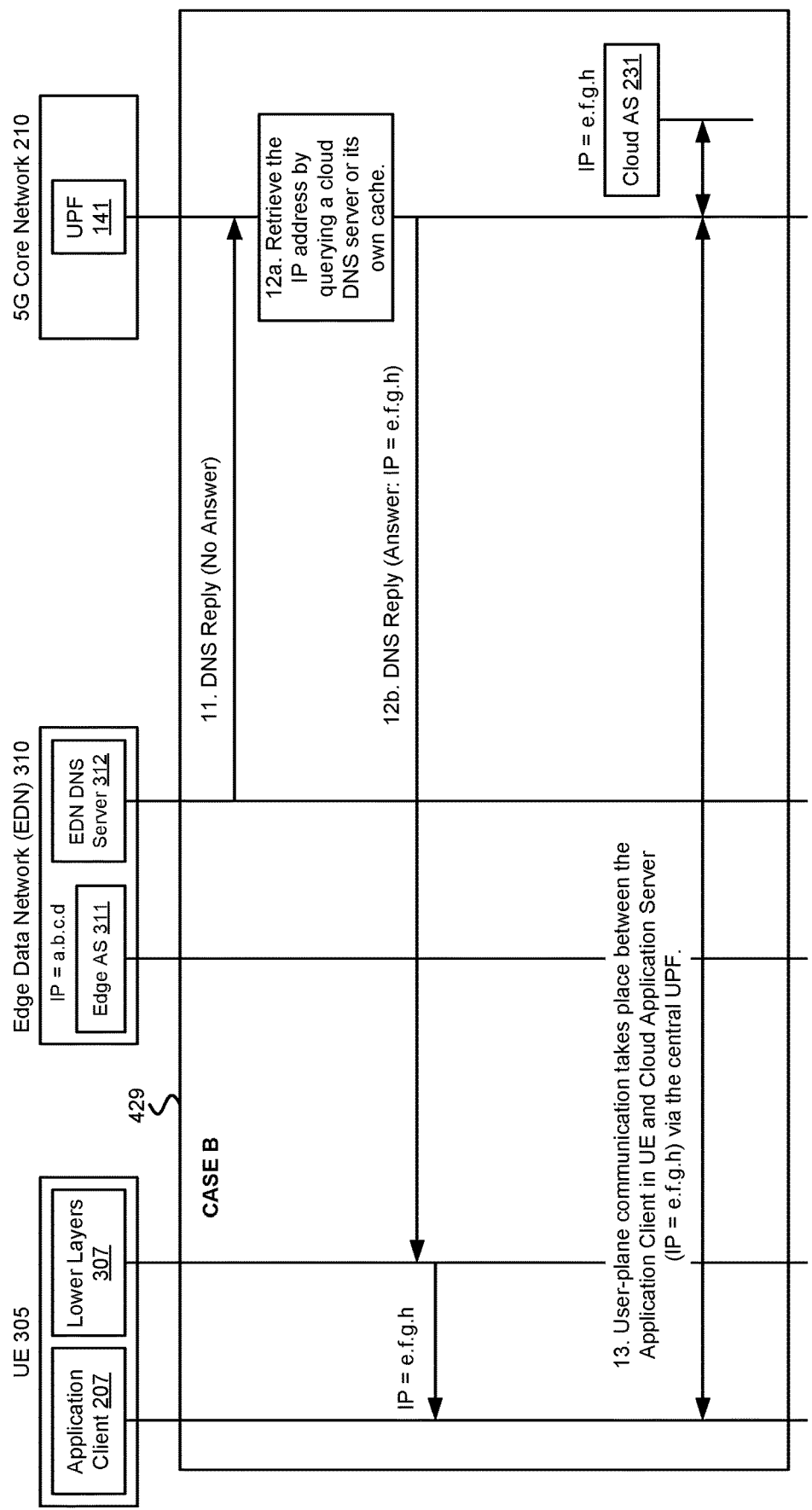
FIG. 4C is a continuation of the procedure depicted in FIGS. 4A and 4B.

FIGS. 4A-4C depict a procedure 400 for a UPF-based DNS handling solution, according to embodiments of the disclosure. The procedure 400 involves a UE 305, the EDN 310, and the 5G core network 210. The procedure 400 represents an alternative solution to the procedure 300 described above. In this alternative solution, there is no ARF. Rather, the procedure 400 utilizes additional functionality in UPF, in SMF, and in AMF, which enables the mobile communication network to detect when the UE 305 attempts to discover the IP address of an Application Server and to provide to the UE 305 the IP address of the physically closest Application Server, i.e., of an Application Server located in an Edge Data Network (EDN).

At FIG. 4A, the procedure 400 begins at Step 0 where a function in the EDN 310 provides "traffic influence" information for the Edge Application Server 311 in the EDN 310 (see messaging 407). In certain embodiments, said function is an Edge Enabler Server ("EES") 405 as specified in 3GPP TR 23.578, which is incorporated by reference. This traffic influence information is provided to NEF 313 and then stored to UDR 314, according to existing procedures. The traffic influence information specifies how selected traffic should be routed by 5GC.

In a general example, the traffic influence information may indicate that: "The traffic transmitted by an individual UE or a group of UEs, or any UE, located anywhere, or in a specific area, and via any PDU Session, or via a PDU Session with a certain DNN and/or S-NSSAI, that matches some traffic filter information, should be routed via an N6 interface located in a certain DNAI". In a more specific example applicable to FIGS. 4A-4C, it may indicate that: "The traffic transmitted by any UE, located in a specific area that is destined to IP address 'a.b.c.d' should be routed via an N6 interface located in DNAI-2". The traffic influence information stored in UDR 314 can be used by the PCF 147 to create associated PCC rules for the selected traffic.

At step 1, the UE 305 performs a normal 5G registration to register with the 5G network (see block 409). At step 2, the UE 305 requests the establishment of a PDU Session, e.g., in order to access the Internet via the 5G network. It is assumed that the UE 305 is presently outside of an EDN Service Area 125 (see block 411). This is determined by the AMF 143 (based on the location information received from the access network) and is forwarded to SMF 145, which decides not to insert a local UPF 410 in the data path of the PDU Session. Thus, only a central UPF 141 is inserted in the data path.

Note that the AMF 143 is to determine when the UE 305 is inside or outside an EDN service area 125 and, for this purpose, the AMF 143 is to be configured with information about the EDNs deployed in the 5G network. Note also that the SMF 145 may receive PCC rules 413 from PCF 147 with traffic influence information indicating that some traffic from the UE 305 should be routed locally via a certain DNAI. However, the SMF 145 does not insert a local UPF 405 to the data path of the PDU Session because the SMF 145 does not know if the UE 305 will later initiate this traffic that should be routed via the DNAI.

The SMF 145 subscribes with the AMF 143 to be notified when the UE 305 enters or exists an EDN Service Area. In addition, the UE 305 receives the address of a DNS Server. Because the UE 305 is assumed to be outside of an EDN Service Area, the UE 305 receives the address of the Cloud DNS Server 233, so all DNS queries of the UE 305 are sent to the Cloud DNS Server 233.

At step 3, the UE 305 moves to a new location and enters an EDN Service Area 125 (sec block 415). If the UE 305 is in CONNECTED state, or as soon as the UE 305 transits to the CONNECTED state, the AMF 143 receives new location information for the UE 305 and identifies that the UE 305 has entered an EDN Service Area 125. This information is propagated to SMF 145 with a Notify message (see messaging 417).

At step 4, the SMF 145 configures the UPF 141 to forward subsequent DNS queries from the UE 305 to the EDN DNS Server 312 in the EDN 310 where the UE 305 is located (see messaging 419). It is assumed that the SMF 145 is configured to know the address of the EDN DNS Server in each EDN. In certain embodiments, the SMF 145 also subscribes with UPF 141 to receive a notification, when the EDN DNS Server 312 provides an answer to a DNS query.

Continuing on FIG. 4B, at step 5, an Application Client 207 in the UE 305 wants to start communication with an Application Server with a hostname (or FQDN) app1.example.com. To resolve the hostname into an IP address, the UE 305 sends a DNS query including the FQDN (see messaging 421). At step 6, the UPF 141 detects the DNS query from the UE 305 (see messaging 423) and (based on the configuration in step 4) it forwards the DNS query to the EDN DNS Server 312 (see messaging 425).

FIG. 4B depicts the Case A where the DNS reply from the EDN DNS server 312 contains an IP address (see block 427). At step 7, the EDN DNS server 312 resolves the FQDN into the IP address 'a.b.c.d' and sends a DNS Reply to UPF 141. At step 8*a*, the UPF 141 notifies the SMF 145 that the UE 305 attempts to communicate with IP address 'a.b.c.d' in the EDN 310. At step 8*b*, the UPF 141 forwards the DNS Reply to UE 305.

At step 9, after receiving the notification in step 8*a*, the SMF 145 determines if it has a PCC rule (received from PCF during step 2) with traffic influence information for the traffic destined to IP address 'a.b.c.d'. One such PCC rule is illustrated in FIG. 4A (see PCC Rule-2 in step 2), which indicates that traffic to IP address 'a.b.c.d' should be routed via DNAI-2.

If the SMF 145 finds a PCC rule with traffic influence information for the traffic destined to IP address "a.b.c.d," then the SMF 145 applies the PCC rules, i.e. selects a local UPF 410 that can provide access via DNAI-2 (e.g., a UPF deployed near "Frankfurt airport") and configures this local UPF 410 to route the uplink traffic (sent from UE 305) to the destination IP address 'a.b.c.d' via DNAI-2. All other traffic is routed by the local UPF 410 to the central UPF 141.

At step 10, user-plane communication takes place between the Application Client 207 in the UE 305 and the Edge Application Server 311 in the EDN 310 via the local UPF 410. Later, when the SMF 145 determines that the UE 305 exits the EDN Service Area 125, the SMF 145 may remove the local UPF 410 from the data path of the PDU Session and can configure the central UPF 141 to forward subsequent DNS queries from the UE 305 to a Cloud DNS Server 233.

FIG. 4C depicts the Case B where the DNS reply from the EDN DNS server 312 does not contain an IP address (or no answer is received from EDN DNS server 312) (see block 429). FIG. 4C continues from step 6 of FIG. 4B where the UPF 141 detects the DNS query from the UE 305 and (based on the configuration in step 4) it forwards the DNS query to the EDN DNS Server 312.

At step 11, the EDN DNS server 312 cannot resolve the FQDN into an IP address because there is no Application Server in the EDN 310 identified by the provided FQDN. Therefore, the EDN DNS server 312 responds with a DNS Reply containing no answer (no IP address). At step 12*a*, the UPF 141 retrieves the IP address by forwarding the DNS query to a cloud DNS server (e.g., Cloud DNS server 233) or by resolving the FQDN using its own DNS information (cache). As a result, the FQDN is resolved to the IP address 'e.f.g.h.'

At step 12, the UPF 141 sends the DNS Reply to UE 305. At step 13, user-plane communication takes place between the Application Client 207 in the UE 305 and the Cloud Application Server 231 via the central UPF 141.

Figure 5:
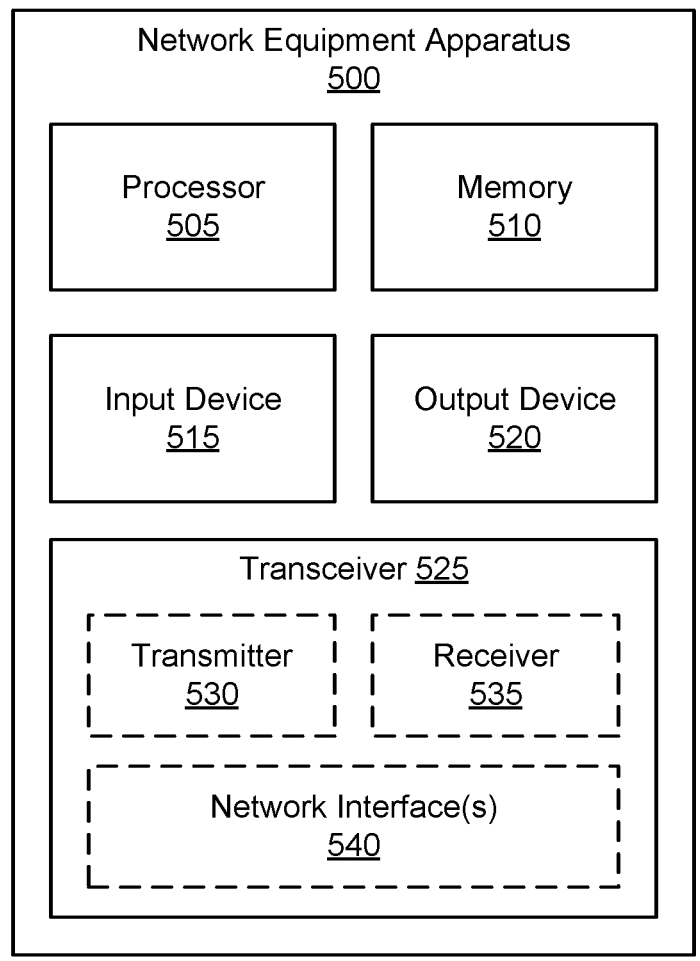
FIG. 5 is a block diagram illustrating one embodiment of a network equipment apparatus for supporting edge data network discovery.

FIG. 5 depicts one embodiment of a network equipment apparatus 500 that may be used for supporting edge data network discovery, according to embodiments of the disclosure. In some embodiments, the network equipment apparatus 500 may be one embodiment of a DNS Server/Proxy 225. In certain embodiments, the network equipment apparatus 500 may be an embodiment of the ARF 149. In other embodiments, the network equipment apparatus 500 may be one embodiment of the SMF 145 and/or the UPF 141. Furthermore, network equipment apparatus 500 may include a processor 505, a memory 510, an input device 515, an output device 520, a transceiver 525. In some embodiments, the input device 515 and the output device 520 are combined into a single device, such as a touch screen. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105. Additionally, the transceiver 525 may support at least one network interface 540. In some embodiments, the transceiver 525 supports a first interface (e.g., an N2 interface) that communicates with RAN node, for example a gNB or eNB, a second interface (e.g., an N8, N11, N15, etc. interfaces) which communicates with one or more control-plane network functions (e.g., UDM, SMF, PCF) in a mobile core network (e.g., a 5GC) and a third interface (e.g., N1 interface) that communicates with a remote unit (e.g., UE) over the first interface (N2 interface) via a 3GPP access network or via a non-3GPP access network.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the network equipment apparatus 500 acts as an ARF. In such embodiments, the processor 505 may receive a first request from a function in the mobile communication network including a UE identity ("UE ID") and a UE network address. Here, the first request may be the 'Create UE Context' request, described above with reference to FIGS. 3A-3C.

The processor 505 determines whether the UE is located in a first service area based on a UE location. In response to determining that the UE is located in the first service area, the processor 505 forwards a DNS request received from the UE network address to a first DNS server associated with the first service area.

Additionally, the processor 505 receives a DNS reply from the first DNS server. Note that the processor 505 receives (a) the first request from the mobile network, (b) the DNS request from the UE, and (c) a first DNS reply for the first DNS server. In response to determining that the DNS reply includes a first IP address, the processor 505 controls the transceiver 525 to send a second request to a policy function in the mobile communication network. Here, the second request may be the policy authorization create request, described above with reference to FIGS. 3A-3C.

In certain embodiments, the UE network address applies to a first mobile data connection (e.g., first PDU session of the UE) having a first UPF, wherein the second request is used to insert a second UPF into the first mobile data connection. In such embodiments, the second UPF provides a local route to the first IP address (e.g., to an AS addressable with the first IP address). In certain embodiments, the second request indicates that the traffic between the UE and the first IP address is to be routed via a local route identified by a Data Network Access Identifier ("DNAI").

In some embodiments, the processor 505 forwards the DNS request to a second DNS server in a cloud data network not associated with a service area (e.g., e.g., not associated with an EDN service area) in response to determining that the UE is not located in any EDN service area, wherein the network equipment apparatus 500 receives a DNS reply from the second DNS server containing a second IP address. In certain embodiments, the processor 505 forwards the DNS request to the second DNS server in response to determining that the DNS reply from the first DNS server does not include a first IP address.

In various embodiments, the first service area corresponds to the service area of an EDN containing a first instance of an application server addressable with the first IP address, while the cloud data network includes a second instance of the application server addressable with the second IP address. In certain embodiments, the processor 505 monitors the UE location using the UE identity in response to receiving the first request.

In some embodiments, the processor 505 generates a second DNS reply in response to determining that the UE is not located in a service area, wherein the second DNS reply contains the second IP address. In some embodiments, the processor 505 generates a second DNS reply in response to determining that the DNS reply from the first DNS server does not include a first IP address, wherein the second DNS reply contains a second IP address.

In various embodiments, the network equipment apparatus 500 acts as a SMF. In such embodiments, the processor 505 receives a first request from a UE to establish a mobile data connection (e.g., receives a request to establish a PDU session for the UE) and selects a first UPF for the mobile data connection. The processor 505 determines whether the UE is located in a first service area and configures the first UPF to forward a DNS request received from the UE to a first DNS server associated with the first service area in response to determining that the UE is located in the first service area (e.g., an EDN service area).

The processor 505 receives a first message from the first UPF, the first message indicating that the first DNS server has provided a DNS reply including a first IP address and inserts a second UPF to the mobile data connection that provides a local route to the first IP address (e.g., a route to a local instance of an application server located in the EDN).

In certain embodiments, the processor 505 subscribes with a mobility in the mobile communication network function (e.g., AMF) to be notified when the UE enters the first service area and to be notified when the UE exits the first service area. In certain embodiments, the processor 505 configures the first UPF to not forward a DNS request received from the UE to the first DNS server associated with the first service area in response to determining that the UE exits the first service area. When the UE is not in an EDN service area, the UPF routes DNS requests based on their destination address, i.e., the UPF does not need any configuration from the network equipment apparatus 500. Note that the UE always sends DNS queries to the address of the DNS server in the cloud data network. However, if the UE is in an EDN service area, then the UPF intercepts the DNS queries forwards them to the EDN DNS server instead.

In certain embodiments, the processor 505 configures the first UPF to forward the DNS request to a second DNS server in a cloud data network not associated with a service area in response to the UPF determining that a DNS reply provided by the first DNS server does not include a first IP address, wherein a DNS reply from the second DNS server contains a second IP address.

In various embodiments, the network equipment apparatus 500 acts as a UPF. In such embodiments, the processor 505 receives a first instruction to forward a DNS request received from a UE to a first DNS server associated with a first service area and forwards a DNS request received from the UE to the first DNS server associated with the first service area in response to receiving the instruction. Moreover, the processor 505 receives a DNS reply from the first DNS server and controls the transceiver 525 to send a first message to a session management function in the mobile communication network in response to determining that the DNS reply includes a first IP address.

In some embodiments, the processor 505 receives a second instruction to not forward a DNS request received from the UE to the first DNS server associated with the first service area in response to the UE exiting the first service area. When the UE is not in an EDN service area, the processor 505—acting as UPF—routes DNS requests based on their destination address, i.e., the UPF does not need any configuration from the SMF. Note that the UE always sends DNS queries to the address of the DNS server in the cloud data network. However, if the UE is in an EDN service area, then the processor 505 intercepts the DNS queries forwards them to the EDN DNS server instead.

In some embodiments, the processor 505 forwards the DNS request to a second DNS server in a cloud data network not associated with a service area in response to determining that the DNS reply from the first DNS server does not include the first IP address. In some embodiments, the processor 505 forwards the DNS request to the second DNS server in a cloud data network not associated with a service area in response to determining that the UE is not located in an EDN service area, wherein the apparatus receives a DNS reply from the second DNS server containing a second IP address.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to supporting edge data network discovery, for example storing server addresses, UE locations, DNS cache, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
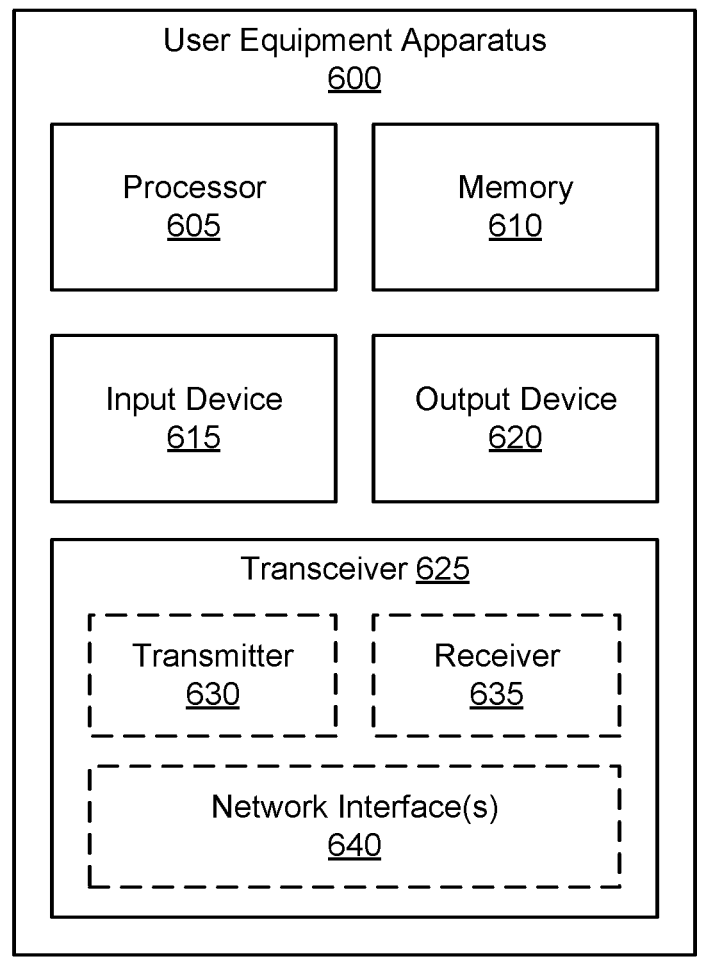
FIG. 6 is a block diagram illustrating one embodiment of a user equipment apparatus for supporting edge data network discovery.

FIG. 6 depicts one embodiment of a user equipment apparatus 600 that may be used for supporting edge data network discovery, according to embodiments of the disclosure. The user equipment apparatus 600 may be one embodiment of the remote unit 105. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via an access network. Additionally, the transceiver 625 may support at least one network interface 640. Here, the at least one network interface 640 facilitates communication with an eNB or gNB (e.g., using the "Uu" interface). Additionally, the at least one network interface 640 may include an interface used for communications with an UPF, an SMF, and/or a P-CSCF.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the transceiver 625 to send a DNS query via the mobile communication network. Here, the DNS query is addressed to a DNS server in the cloud data network. However, if the user equipment apparatus 600 is located in an EDN service area, then the ARF and/or UPF intercepts the DNS queries forwards them to the EDN DNS server instead.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to supporting edge data network discovery, for example storing DNS server IP addresses, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
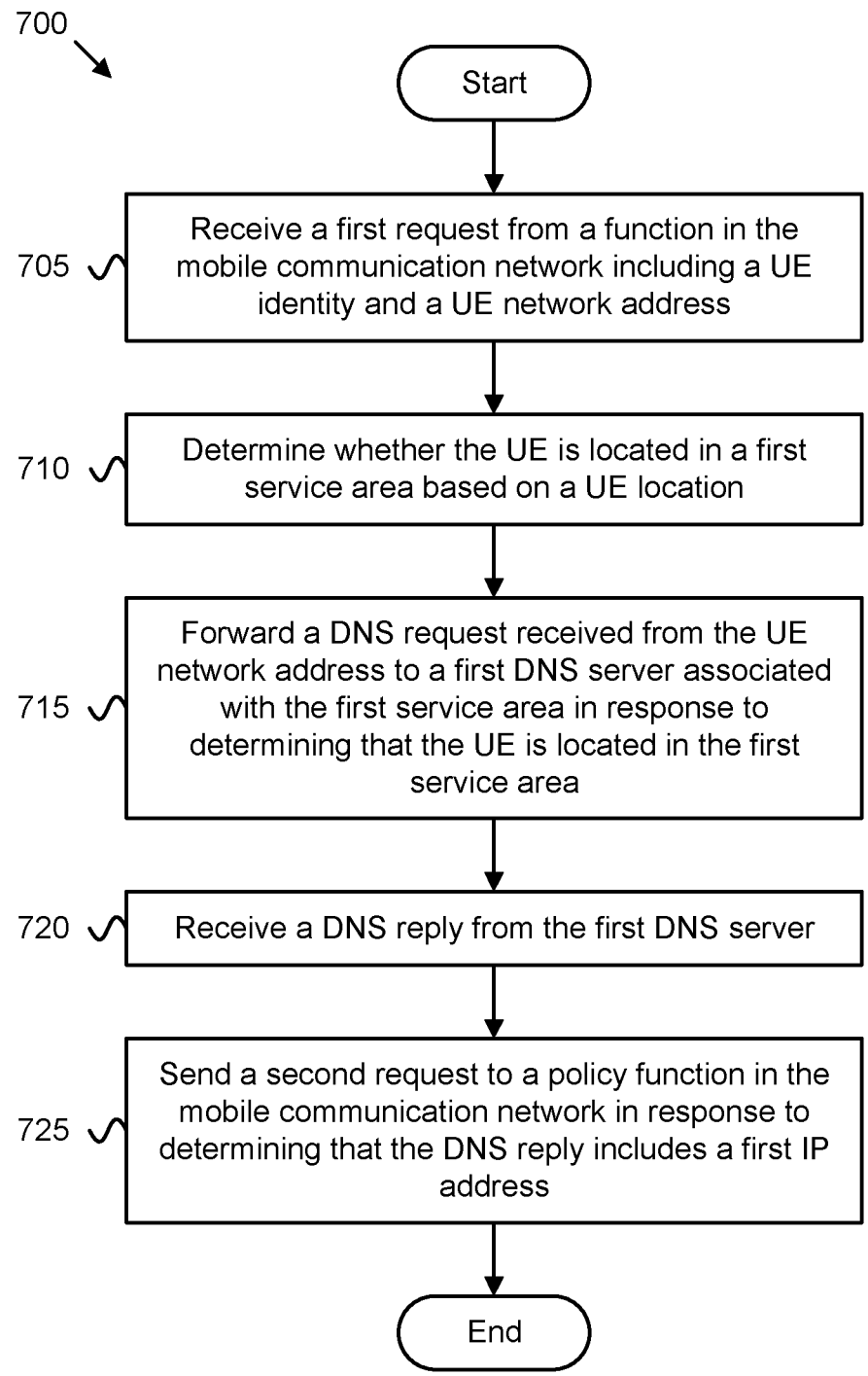
FIG. 7 is a flow chart diagram illustrating one embodiment of a first method for supporting edge data network discovery.

FIG. 7 depicts a method 700 for supporting edge data network discovery, according to embodiments of the disclosure. In some embodiments, the method 700 is performed by a network apparatus, such as the ARF 149 and/or the network equipment apparatus 500. In certain embodiments, the method 700 may be performed by a processor executing program code, for example, a microcontroller, a microprocessor, a CPU, a GPU, an auxiliary processing unit, a FPGA, or the like.

The method 700 begins and receives 705 a first request from a function in the mobile communication network including a UE identity and a UE network address. Here, the first request may be a 'Create UE Context' request, as described above with reference to FIGS. 3A-3C.

The method 700 includes determining 710 whether the UE is located in a first service area based on a UE location. The method 700 includes forwarding 715 a DNS request received from the UE network address to a first DNS server associated with the first service area in response to determining that the UE is located in the first service area.

The method 700 includes receiving 720 a DNS reply from the first DNS server. The method 700 includes sending 725 a second request to a policy function in the mobile communication network in response to determining that the DNS reply includes a first IP address. Here, the second request may be a 'Policy Authorization Create' request, as described above with reference to FIGS. 3A-3C. The method 700 ends.

Figure 8:
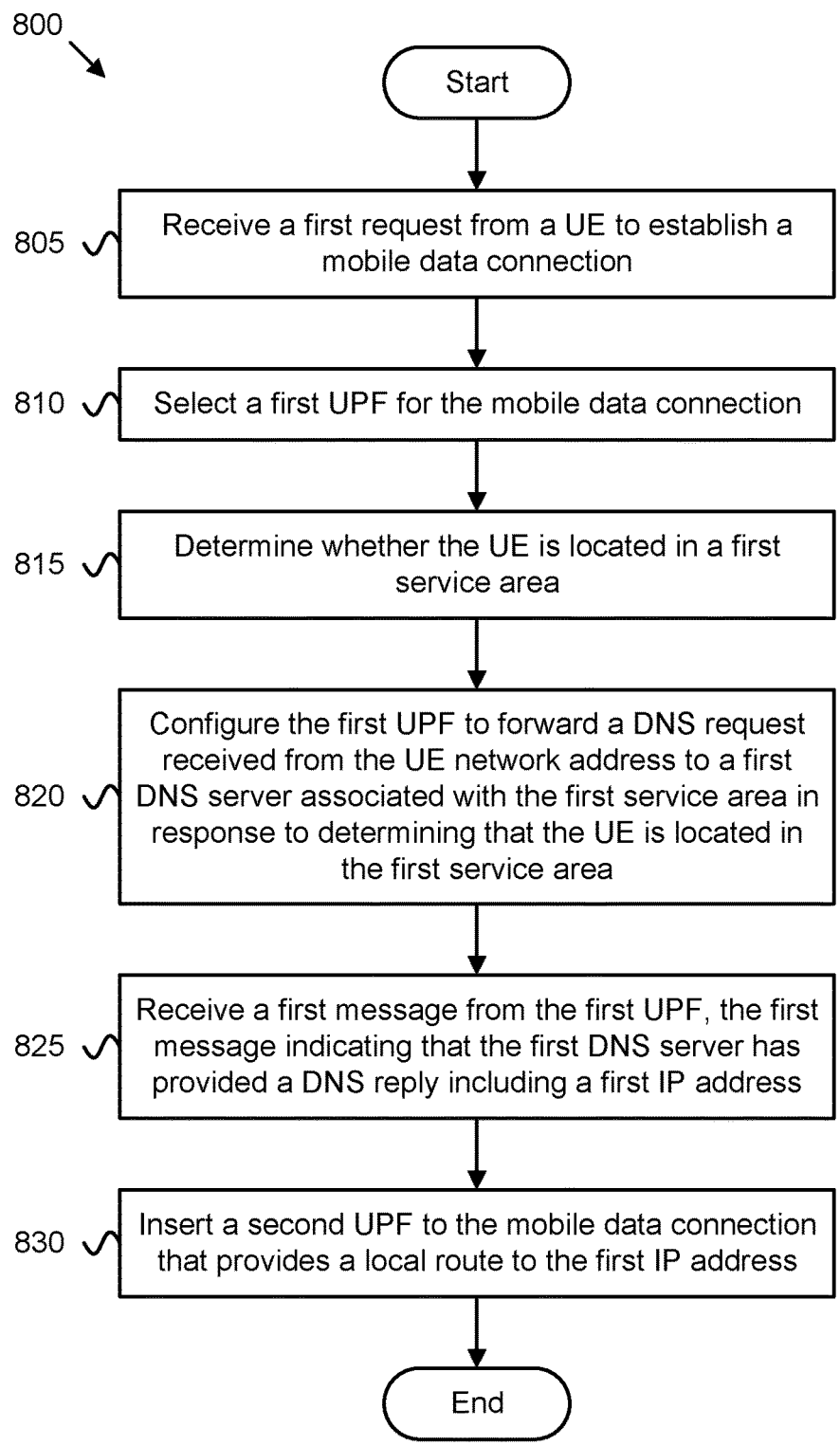
FIG. 8 is a flow chart diagram illustrating one embodiment of a second method for supporting edge data network discovery.

FIG. 8 depicts a method 800 for supporting edge data network discovery, according to embodiments of the disclosure. In some embodiments, the method 800 is performed by a network apparatus, such as the SMF 145 and/or the network equipment apparatus 500. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a first request from a UE to establish a mobile data connection. In various embodiments, the mobile data connection comprises a PDU session. The method 800 includes selecting 810 a first UPF for the mobile data connection.

The method 800 includes determining 815 whether the UE is located in a first service area. The method 800 includes configuring 820 the first UPF to forward a DNS request received from the UE to a first DNS server associated with the first service area in response to determining that the UE is located in the first service area.

The method 800 includes receiving 825 a first message from the first UPF, the first message indicating that the first DNS server has provided a DNS reply including a first IP address. The method 800 includes inserting 830 a second UPF to the mobile data connection that provides a local route to the first IP address. The method 800 ends.

Figure 9:
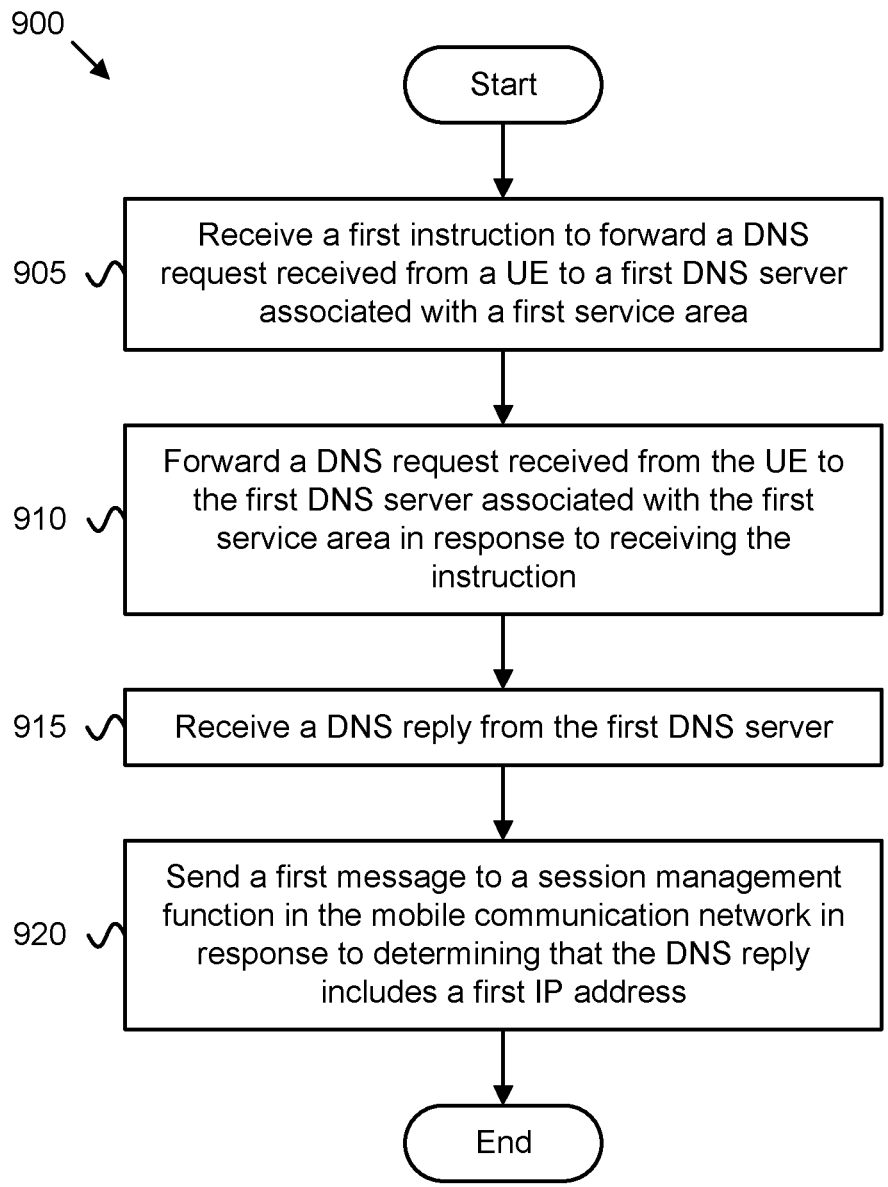
FIG. 9 is a flow chart diagram illustrating one embodiment of a third method for supporting edge data network discovery.

FIG. 9 depicts a method 900 for supporting edge data network discovery, according to embodiments of the disclosure. In some embodiments, the method 900 is performed by a network function, such as the UPF 141 and/or the network equipment apparatus 500. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a first instruction to forward a DNS request received from a UE to a first DNS server associated with a first service area. The method 900 includes forwarding 910 a DNS request received from the UE to the first DNS server associated with the first service area in response to receiving the instruction.

The method 900 includes receiving 915 a DNS reply from the first DNS server. The method 900 includes sending 920 a first message to a session management function in the mobile communication network in response to determining that the DNS reply includes a first IP address. The method 900 ends.

Disclosed herein is a first apparatus for supporting edge data network discovery, according to embodiments of the disclosure. The first apparatus may be implemented by a network function, such as the ARF 149, and/or the network equipment apparatus 500. The first apparatus includes a transceiver and a processor that receives a first request (e.g., a Create UE context request) from a function in the mobile communication network including a UE identity and a UE network address and determines whether the UE is located in a first service area based on a UE location. In response to determining that the UE is located in the first service area, the processor forwards a DNS request received from the UE network address to a first DNS server associated with the first service area. Via the transceiver, the processor receives a DNS reply from the first DNS server and sends a second request (e.g., a policy authorization create request) to a policy function in the mobile communication network in response to determining that the DNS reply includes a first IP address.

In some embodiments, the UE network address applies to a first mobile data connection (e.g., a PDU session) having a first user-plane function, wherein the second request is used to insert a second user-plane function into the first mobile data connection, wherein the second user-plane function provides a local route to the first IP address. In some embodiments, the processor monitors the UE location using the UE identity in response to receiving the first request.

In some embodiments, the processor forwards the DNS request to a second DNS server in a cloud data network not associated with a service area (e.g., not associated with an edge service area) in response to determining that the UE is not located in a service area, wherein the apparatus receives a DNS reply from the second DNS server containing a second IP address. In certain embodiments, the first service area corresponds to the service area of an edge data network including a first instance of an application server addressable with the first IP address, wherein the cloud data network includes a second instance of the application server addressable with the second IP address. In certain embodiments, the processor forwards the DNS request to the second DNS server in response to determining that the DNS reply from the first DNS server does not include a first IP address.

In some embodiments, the processor generates a second DNS reply in response to determining that the UE is not located in a service area, wherein the second DNS reply contains a second IP address. In some embodiments, the processor generates a second DNS reply in response to determining that the DNS reply from the first DNS server does not include a first IP address, wherein the second DNS reply contains a second IP address. In some embodiments, the second request indicates that the traffic between the UE and the first IP address is to be routed via a local route identified by a Data Network Access Identifier ("DNAI").

Disclosed herein is a first method for supporting edge data network discovery, according to embodiments of the disclosure. The first method may be performed by a network function, such as the ARF 149 and/or the network equipment apparatus 500. The first method includes receiving a first request (e.g., a 'Create UE Context' request, as described above) from a function in the mobile communication network including a UE identity and a UE network address and determining whether the UE is located in a first service area based on a UE location. The first method includes forwarding a DNS request received from the UE network address to a first DNS server associated with the first service area in response to determining that the UE is located in the first service area and receiving a DNS reply from the first DNS server. The first method includes sending a second request (e.g., a 'Policy Authorization Create' request, as described above) to a policy function in the mobile communication network in response to determining that the DNS reply includes a first IP address.

In certain embodiments, the UE network address applies to a first mobile data connection (e.g., a PDU session) having a first user-plane function, wherein the second request is used to insert a second user-plane function into the first mobile data connection, wherein the second user-plane function provides a local route to the first IP address. In some embodiments, the first method includes monitoring the UE location using the UE identity in response to receiving the first request.

In some embodiments, the first method includes 1) forwarding the DNS request to a second DNS server in a cloud data network not associated with a service area in response to determining that the UE is not located in a service area (e.g., edge network service area) and 2) receiving a DNS reply from the second DNS server containing a second IP address. In certain embodiments, the first service area corresponds to the service area of an edge data network including a first instance of an application server addressable with the first IP address, wherein the cloud data network includes a second instance of the application server addressable with the second IP address. In certain embodiments, the first method includes forwarding the DNS request to the second DNS server in response to determining that the DNS reply from the first DNS server does not include a first IP address.

In some embodiments, the first method includes generating a second DNS reply in response to determining that the UE is not located in a service area, wherein the second DNS reply contains a second IP address. In some embodiments, the first method includes generating a second DNS reply in response to determining that the DNS reply from the first DNS server does not include a first IP address, wherein the second DNS reply contains a second IP address. In certain embodiments, the second request indicates that the traffic between the UE and the first IP address is to be routed via a local route identified by a Data Network Access Identifier ("DNAI").

Disclosed herein is a second apparatus for supporting edge data network discovery, according to embodiments of the disclosure. The second apparatus may be implemented by a network function, such as the SMF 145 and/or the network equipment apparatus 500. The second apparatus includes a transceiver and processor that receives a first request from a UE to establish a mobile data connection (e.g., a PDU Session Establishment request) and selects a first user-plane function for the mobile data connection. The processor determines whether the UE is located in a first service area and configures the first user-plane function to forward a DNS request received from the UE to a first DNS server associated with the first service area in response to determining that the UE is located in the first service area. Via the transceiver the processor receives a first message from the first user-plane function, the first message indicating that the first DNS server has provided a DNS reply including a first IP address. The processor inserts a second user-plane function to the mobile data connection that provides a local route to the first IP address.

In some embodiments, subscribes with a mobility function in the mobile communication network to be notified when the UE enters the first service area and to be notified when the UE exits the first service area. In some embodiments, configures the first user-plane function to not forward a DNS request received from the UE to the first DNS server associated with the first service area in response to determining that the UE exits the first service area.

In some embodiments, the processor configures the first user-plane function to forward the DNS request to a second DNS server in a cloud data network not associated with a service area in response to the user-plane function determining that a DNS reply provided by the first DNS server does not include a first IP address, wherein a DNS reply from the second DNS server contains a second IP address. In certain embodiments, the first service area corresponds to the service area of an edge data network including a first instance of an application server addressable with the first IP address, wherein the cloud data network includes a second instance of the application server addressable with the second IP address.

Disclosed herein is a second method for supporting edge data network discovery, according to embodiments of the disclosure. The second method may be performed by a network function, such as the SMF 145 and/or the network equipment apparatus 500. The second method includes receiving a first request from a UE to establish a mobile data connection and selecting a first user-plane function for the mobile data connection. The second method includes determining whether the UE is located in a first service area and configuring the first user-plane function to forward a DNS request received from the UE to a first DNS server associated with the first service area in response to determining that the UE is located in the first service area. The second method includes receiving a first message from the first user-plane function, the first message indicating that the first DNS server has provided a DNS reply including a first IP address and inserting a second user-plane function to the mobile data connection that provides a local route to the first IP address.

In some embodiments, the second method includes subscribing with a mobility function in the mobile communication network to be notified when the UE enters the first service area and to be notified when the UE exits the first service area. In some embodiments, the second method includes configuring the first user-plane function to not forward a DNS request received from the UE to the first DNS server associated with the first service area in response to determining that the UE exits the first service area.

In some embodiments, the second method includes configuring the first user-plane function to forward the DNS request to a second DNS server in a cloud data network not associated with a service area in response to the user-plane function determining that a DNS reply provided by the first DNS server does not include a first IP address, wherein a DNS reply from the second DNS server contains a second IP address. In certain embodiments, the first service area corresponds to the service area of an edge data network including a first instance of an application server addressable with the first IP address, wherein the cloud data network includes a second instance of the application server addressable with the second IP address.

Disclosed herein is a third apparatus for supporting edge data network discovery, according to embodiments of the disclosure. The third apparatus may be implemented by a network function, such as the UPF 141 and/or the network equipment apparatus 500. The third apparatus includes a transceiver and a processor that receives a first instruction to forward a DNS request received from a UE to a first DNS server associated with a first service area. The processor forwards a DNS request received from the UE to the first DNS server associated with the first service area in response to receiving the instruction and receives (via the transceiver)

a DNS reply from the first DNS server. In response to determining that the DNS reply includes a first IP address, the processor sends (via the transceiver) a first message to a session management function in the mobile communication network.

In response to the UE exiting the first service area, the third apparatus may receive a second instruction to not forward a DNS request received from the UE to the first DNS server associated with the first service area. In certain embodiments, the processor forwards the DNS request to the second DNS server in a cloud data network not associated with a service area in response to determining that the UE is not located in a service area, wherein the apparatus receives a DNS reply from the second DNS server containing a second IP address.

In some embodiments, the processor forwards the DNS request to a second DNS server in a cloud data network not associated with a service area in response to determining that the DNS reply from the first DNS server does not include the first IP address. In certain embodiments, the first service area corresponds to the service area of an edge data network including a first instance of an application server addressable with the first IP address, wherein the cloud data network includes a second instance of the application server addressable with a second IP address.

Disclosed herein is a third method for supporting edge data network discovery, according to embodiments of the disclosure. The third method may be performed by a network function, such as the UPF 141 and/or the network equipment apparatus 500. The third method includes receiving a first instruction to forward a DNS request received from a UE to a first DNS server associated with a first service area and forwarding a DNS request received from the UE to the first DNS server associated with the first service area in response to receiving the instruction. The third method includes receiving a DNS reply from the first DNS server and sending a first message to a session management function in the mobile communication network in response to determining that the DNS reply includes a first IP address.

In some embodiments, the third method includes receiving a second instruction to not forward a DNS request received from the UE to the first DNS server associated with the first service area in response to the UE exiting the first service area. In certain embodiments, first service area corresponds to the service area of an edge data network including a first instance of an application server addressable with the first IP address, wherein the cloud data network includes a second instance of the application server addressable with a second IP address.

In some embodiments, the third method includes forwarding the DNS request to a second DNS server in a cloud data network not associated with a service area in response to determining that the DNS reply from the first DNS server does not include the first IP address. In some embodiments, the third method includes forwarding the DNS request to the second DNS server in a cloud data network not associated with a service area in response to the UE not being located in a service area and receiving a DNS reply from the second DNS server containing a second IP address.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a first network function, the apparatus comprising:
   at least one memory; and
   at least one processor coupled with the at least one memory and configured to cause the first network function to:
      receive, from a second network function, a first request comprising a user equipment (UE) identity of a UE and a UE network address of the UE;
      receive a domain name system (DNS) request associated with the UE network address;
      forward the DNS request to a first DNS server associated with a first service area based at least in part on a location of the UE being associated with the first service area;
      receive a DNS reply from the first DNS server; and
      transmit, to a third network function, a message based at least in part on an internet protocol (IP) address included in the DNS reply.

2. The apparatus of claim 1, wherein the UE network address comprises a second IP address, and wherein the at least one processor is configured to cause the first network function to transmit, to the second network function, a subscription request for subscribing to an IP address change event associated with the UE.

3. The apparatus of claim 1, wherein the at least one processor is configured to cause the first network function to:
   transmit, to the second network function, a subscription request for subscribing to a location change event associated with the UE;
   receive one or more location reports from the second network function; and
   determine that the location of the UE is associated with the first service area based at least in part on the one or more location reports.

4. The apparatus of claim 1, wherein the at least one processor is configured to cause the first network function to:
   transmit, to a location service network function, a location service query associated with the UE;
   receive a location service response from the location service network function; and
   determine that the location of the UE is associated with the first service area based at least in part on the location service response.

5. The apparatus of claim 1, wherein the at least one processor is configured to cause the first network function to receive a configuration indicating an edge data network (EDN), wherein the EDN is associated with the first service area, and wherein the EDN comprises the first DNS server.

6. The apparatus of claim 1, wherein the second network function comprises a session management function (SMF), and wherein the at least one processor is configured to cause the first network function to transmit the DNS reply to the UE.

7. The apparatus of claim 1, wherein the message comprises a policy authorization request including the IP address.

8. A method performed by a first network function, the method comprising:
   receiving, from a second network function, a first request comprising a user equipment (UE) identity of a UE and a UE network address of the UE;
   receiving a domain name system (DNS) request associated with the UE network address;

forwarding the DNS request to a first DNS server associated with a first service area based at least in part on a location of the UE being associated with the first service area;

receiving a DNS reply from the first DNS server; and transmitting, to a third network function, a message based at least in part on an internet protocol (IP) address included in the DNS reply.

9. The method of claim 8, wherein the UE network address comprises a second IP address, the method further comprising transmitting, to the second network function, a subscription request for subscribing to an IP address change event associated with the UE.

10. The method of claim 8, further comprising:

transmitting, to the second network function, a subscription request for subscribing to a location change event associated with the UE;

receiving one or more location reports from the second network function; and determining that the location of the UE is associated with the first service area based at least in part on the one or more location reports.

11. The method of claim 8, further comprising:

transmitting, to a location service network function, a location service query associated with the UE;

receiving a location service response from the location service network function; and determining that the location of the UE is associated with the first service area based at least in part on the location services response.

12. The method of claim 8, further comprising receiving a configuration indicating an edge data network (EDN), wherein the EDN is associated with the first service area, and wherein the EDN comprises the first DNS server.

13. The method of claim 8, wherein the second network function comprises a session management function (SMF), and the method further comprising transmitting the DNS reply to the UE.

14. The method of claim 8, wherein the message comprises a policy authorization request including the IP address.

15. A processor for wireless communication, comprising:

at least one controller coupled with at least one memory and configured to cause the processor to:

receive, from a first network function, a first request comprising a user equipment (UE) identity of a UE and a UE network address of the UE;

receive a domain name system (DNS) request associated with the UE network address;

forward the DNS request to a first DNS server associated with a first service area based at least in part on a location of the UE being associated with the first service area;

receive a DNS reply from the first DNS server; and transmit, to a second network function, a message based at least in part on an internet protocol (IP) address included in the DNS reply.

16. The processor of claim 15, wherein the UE network address comprises a second IP address, wherein the at least one controller is configured to cause the processor to transmit, to the first network function, a subscription request for subscribing to an IP address change event associated with the UE.

17. The processor of claim 15, wherein the at least one controller is configured to cause the processor to:

transmit, to the first network function, a subscription request for subscribing to a location change event associated with the UE;

receive one or more location reports from the first network function; and determine that the location of the UE is associated with the first service area based at least in part on the one or more location reports.

18. The processor of claim 15, wherein the at least one controller is configured to cause the processor to:

transmit, to a location service network function, a location service query associated with the UE;

receive a location service response from the location service network function; and determine that the location of the UE is associated with the first service area based at least in part on the location service response.

19. The processor of claim 15, wherein the at least one controller is configured to cause the processor to receive a configuration indicating an edge data network (EDN), wherein the EDN is associated with the first service area, and wherein the EDN comprises the first DNS server.

20. The processor of claim 15, wherein the first network function comprises a session management function (SMF), and wherein the at least one controller is configured to cause the processor to transmit the DNS reply to the UE.

* * * * *